US009178316B1

(12) United States Patent
McCracken et al.

(10) Patent No.: US 9,178,316 B1
(45) Date of Patent: *Nov. 3, 2015

(54) ELECTRONIC CONNECTOR

(71) Applicant: Microsoft Technology Licensing, LLC, Redmond, WA (US)

(72) Inventors: Ivan Andrew McCracken, Sammamish, WA (US); Duane Martin Evans, Snohomish, WA (US); Brett Tomky, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/312,553

(22) Filed: Jun. 23, 2014

Related U.S. Application Data

(63) Continuation of application No. 14/272,361, filed on May 7, 2014, now Pat. No. 9,017,092.

(51) Int. Cl.
*H01R 13/64* (2006.01)
*H01R 13/648* (2006.01)
(Continued)

(52) U.S. Cl.
CPC .............. *H01R 13/648* (2013.01); *H01R 12/91* (2013.01); *H01R 13/26* (2013.01); *H01R 13/62* (2013.01); *H01R 13/629* (2013.01)

(58) Field of Classification Search
CPC ....... H01R 13/26; H01R 13/629; H01R 12/91
USPC ............................................ 439/39, 660, 374
See application file for complete search history.

(56) References Cited

U.S. PATENT DOCUMENTS 2,749,526 A   6/1956   Petersen
3,264,601 A * 8/1966   Hartholz .................... 439/701
(Continued)

FOREIGN PATENT DOCUMENTS

DE   4331280 C1   9/1994
JP   04317899 A   11/1992
(Continued)

OTHER PUBLICATIONS

U.S. Appl. No. 14/162,529, McLaughlin, et al., "Custom DC Power Connector with Magnetic Attach, Female Side", Filed Date: Jan. 23, 2014.
(Continued)

*Primary Examiner* — Neil Abrams
*Assistant Examiner* — Travis Chambers
(74) *Attorney, Agent, or Firm* — Jeremy Snodgrass; Judy Yee; Micky Minhas

(57) ABSTRACT

An electronic connector includes a base, a tapered extension protruding from the base, and a nose forming a terminal end of the tapered extension. The tapered extension includes first and second connection faces tapering toward each other from the base to the nose symmetrically about a first symmetry plane. The tapered extension further includes first and second flank surfaces that form respective opposing sides of the tapered extension between the first and second connection faces. The first and second flank surfaces may taper toward each other from the base to the nose symmetrically about a second symmetry plane. The tapered extension further includes power and ground electrical contacts located along the first and second connection faces.

20 Claims, 7 Drawing Sheets

(51) Int. Cl.
*H01R 13/629* (2006.01)
*H01R 12/91* (2011.01)
*H01R 13/62* (2006.01)
*H01R 13/26* (2006.01)

(56) References Cited

U.S. PATENT DOCUMENTS

| | | | |
|---|---|---|---|
| 3,553,633 | A | 1/1971 | Ondrejka |
| 3,696,319 | A * | 10/1972 | Olsson ............... 439/496 |
| 3,703,615 | A | 11/1972 | Vogt |
| 4,421,371 | A | 12/1983 | Clark et al. |
| 4,640,570 | A | 2/1987 | Strate |
| 4,687,267 | A * | 8/1987 | Header et al. ............ 439/62 |
| 4,824,383 | A * | 4/1989 | Lemke ................. 439/108 |
| 5,176,530 | A * | 1/1993 | Reylek et al. .......... 439/290 |
| 5,409,403 | A | 4/1995 | Falossi et al. |
| RE35,508 | E * | 5/1997 | Lemke et al. .......... 439/101 |
| 5,664,953 | A * | 9/1997 | Reylek ................. 439/111 |
| 6,042,391 | A | 3/2000 | Bodo et al. |
| 6,074,225 | A * | 6/2000 | Wu et al. .............. 439/101 |
| 6,280,209 | B1 * | 8/2001 | Bassler et al. ......... 439/101 |
| 6,322,372 | B1 | 11/2001 | Sato |
| 6,565,363 | B2 | 5/2003 | Downing |
| 6,786,755 | B2 * | 9/2004 | Dambach et al. ....... 439/353 |
| 7,331,793 | B2 | 2/2008 | Hernandez et al. |
| 7,758,379 | B2 * | 7/2010 | Chen ................. 439/607.11 |
| 7,841,776 | B2 | 11/2010 | DiFonzo et al. |
| 8,342,857 | B2 | 1/2013 | Palli et al. |
| 8,506,332 | B2 * | 8/2013 | Sommers et al. ....... 439/607.34 |
| 8,596,881 | B2 | 12/2013 | Umeno |
| 8,821,194 | B2 | 9/2014 | Shih et al. |
| 2012/0015561 | A1 | 1/2012 | Tsai |
| 2012/0177324 | A1 | 7/2012 | Schwandt et al. |
| 2012/0200173 | A1 | 8/2012 | Liu et al. |
| 2013/0040470 | A1 | 2/2013 | Gao et al. |
| 2013/0332642 | A1 | 12/2013 | Capezza |

FOREIGN PATENT DOCUMENTS

| | | |
|---|---|---|
| WO | 2010065569 A2 | 6/2010 |
| WO | 2011163260 A1 | 12/2011 |

OTHER PUBLICATIONS

USPTO, Non-Final Office Action Issued in U.S. Appl. No. 14/272,361, Sep. 4, 2014, 19 Pages.
United States Patent and Trademark Office, Notice of Allowance Issued in U.S. Appl. No. 14/272,361, Mar. 25, 2015, 9 Pages.
ISA European Patent Office, International Search Report and Written Opinion issued in Application No. PCT/US2015/028681, Aug. 20, 2015, WIPO, 11 pages.

* cited by examiner

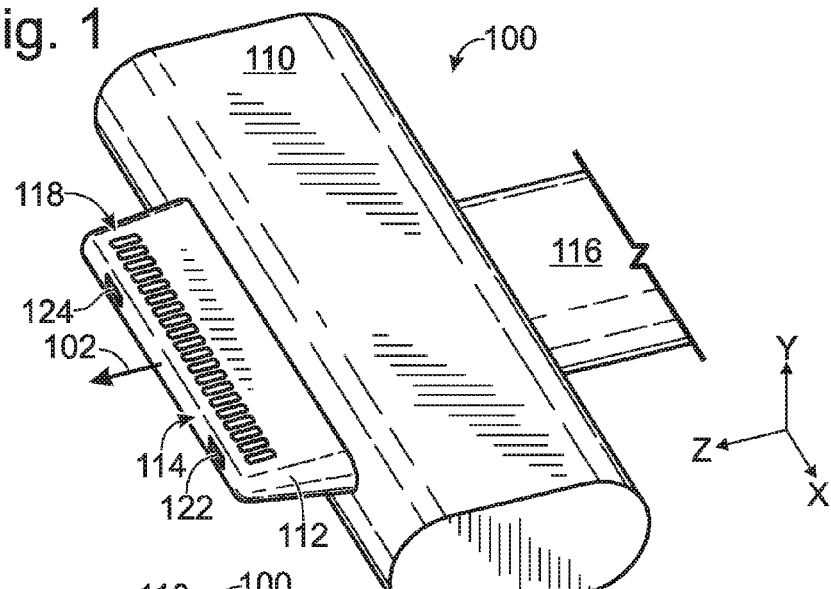
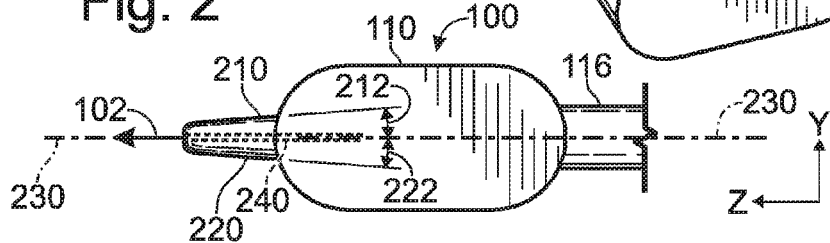
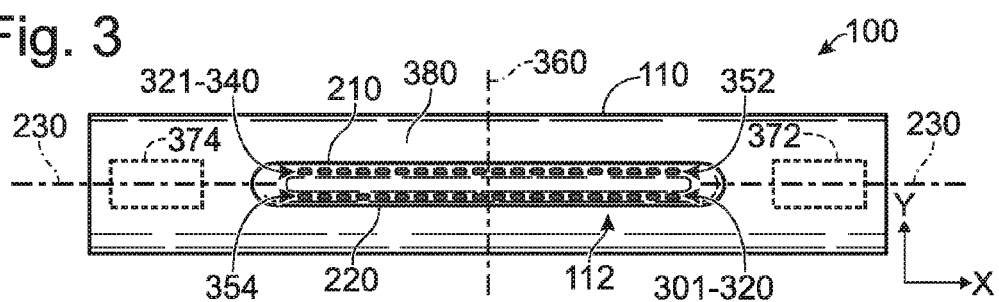
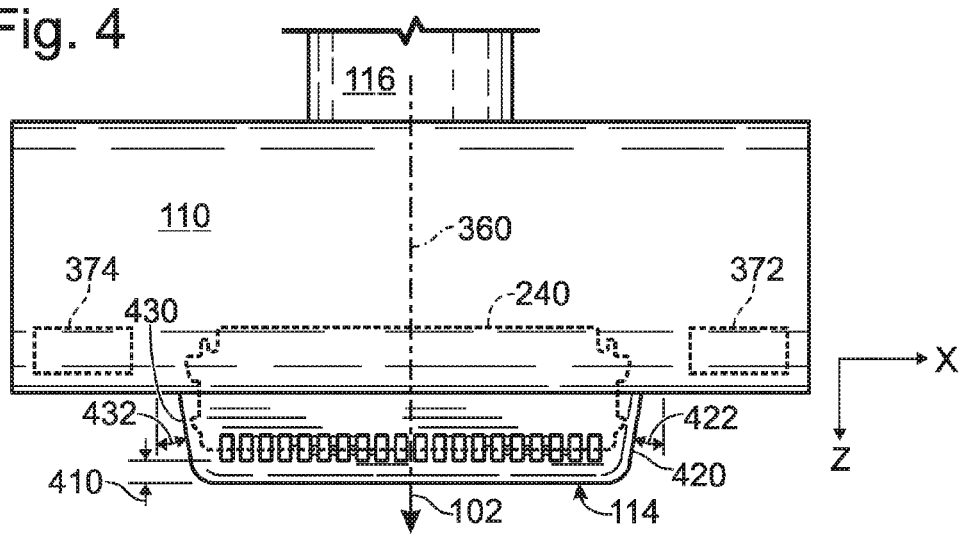

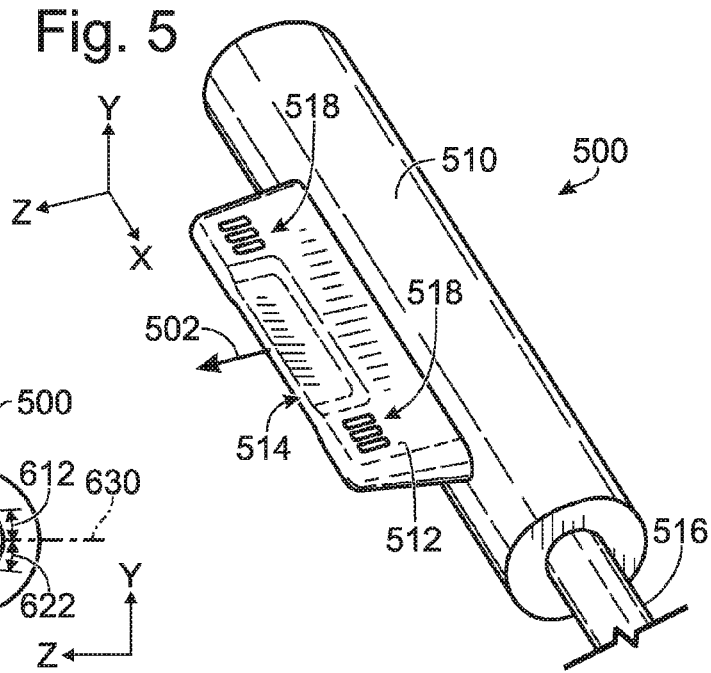
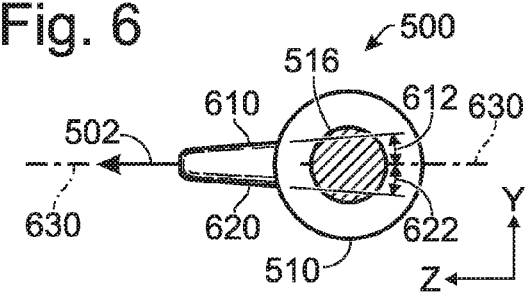
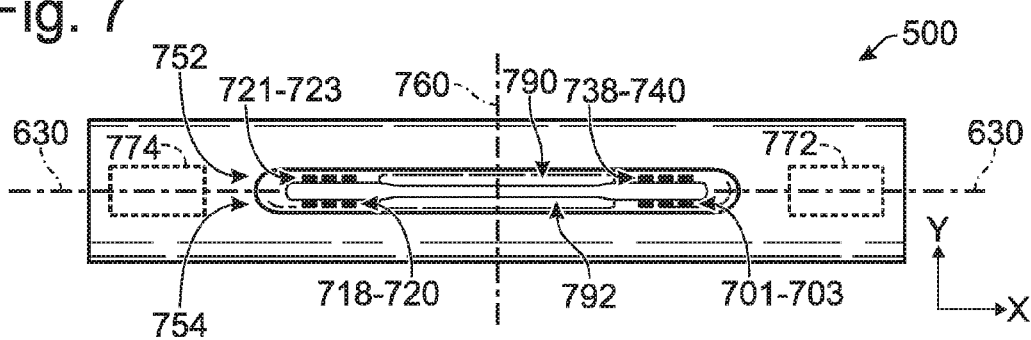
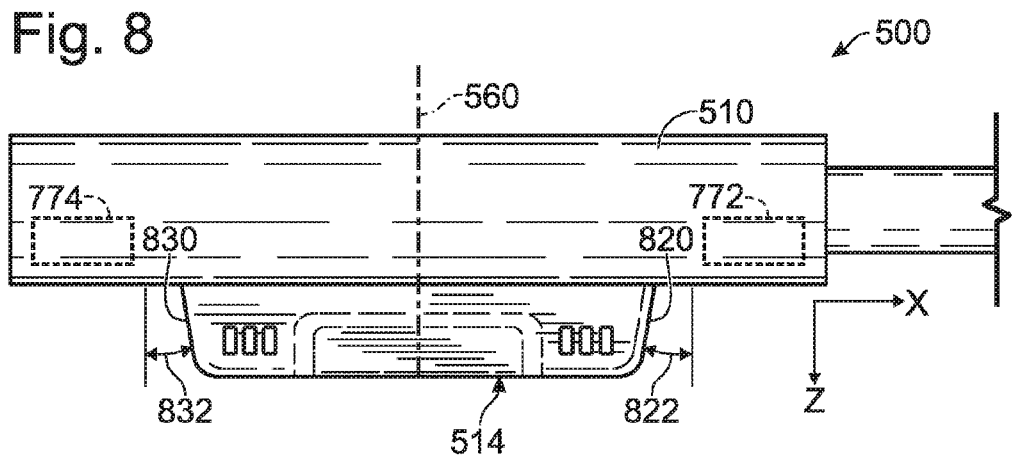

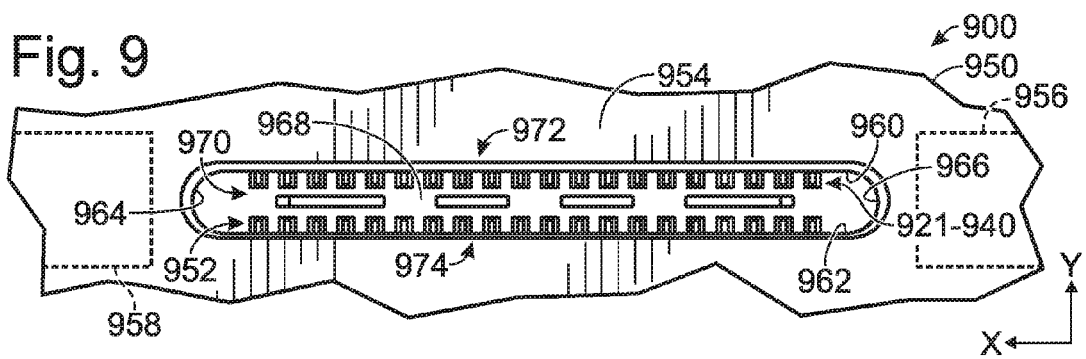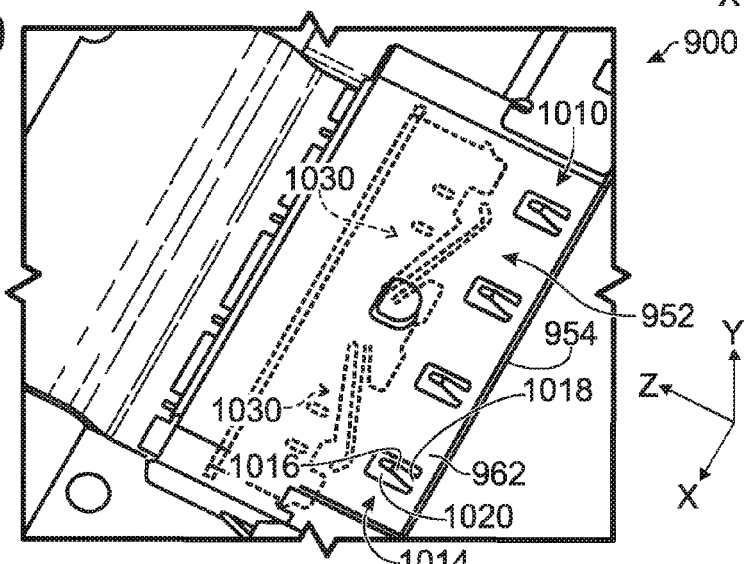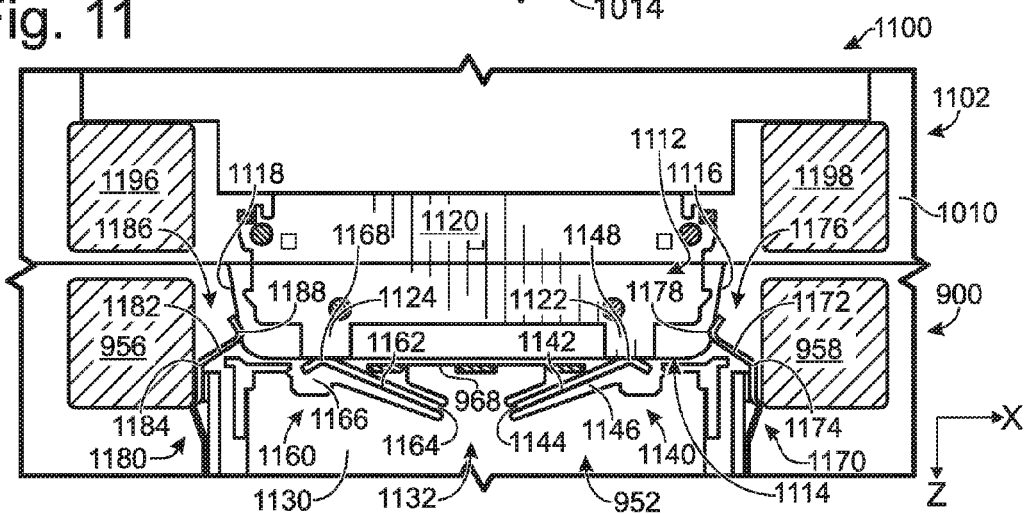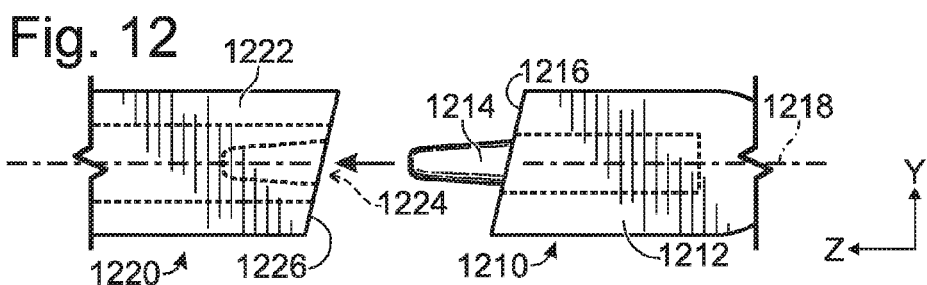

| PIN | CONN. 100 | CONN. 500 | CONN. 900 | CONFIG.A | CONFIG.B | CONFIG.C |
|---|---|---|---|---|---|---|
| P.1 | 301 | 701 | 901 | POWER | POWER | POWER |
| P.2 | 302 | 702 | 902 | HPD1A | HPD1A | HPD1A |
| P.3 | 303 | 703 | 903 | GRND | GRND | GRND |
| P.4 | 304 | | 904 | NC | NC | NC |
| P.5 | 305 | | 905 | NC | NC | NC |
| P.6 | 306 | | 906 | GRND | NC | GRND |
| P.7 | 307 | | 907 | NC | NC | NC |
| P.8 | 308 | | 908 | NC | NC | NC |
| P.9 | 309 | | 909 | GRND | NC | GRND |
| P.10 | 310 | | 910 | NC | NC | NC |
| P.11 | 311 | | 911 | NC | NC | NC |
| P.12 | 312 | | 912 | GRND | NC | GRND |
| P.13 | 313 | | 913 | NC | NC | NC |
| P.14 | 314 | | 914 | NC | NC | NC |
| P.15 | 315 | | 915 | GRND | NC | GRND |
| P.16 | 316 | | 916 | NC | NC | USB 2.0+ |
| P.17 | 317 | | 917 | NC | NC | USB 2.0- |
| P.18 | 318 | 718 | 918 | GRND | GRND | GRND |
| P.19 | 319 | 719 | 919 | HPD2A | HPD2A | HPD2A |
| P.20 | 320 | 720 | 920 | POWER | POWER | POWER |
| P.21 | 321 | 721 | 921 | POWER | POWER | POWER |
| P.22 | 322 | 722 | 922 | HPD2B | HPD2B | HPD2B |
| P.23 | 323 | 723 | 923 | GRND | GRND | GRND |
| P.24 | 324 | | 924 | NC | NC | NC |
| P.25 | 325 | | 925 | NC | NC | NC |
| P.26 | 326 | | 926 | GRND | NC | GRND |
| P.27 | 327 | | 927 | NC | NC | NC |
| P.28 | 328 | | 928 | NC | NC | NC |
| P.29 | 329 | | 929 | GRND | NC | GRND |
| P.30 | 330 | | 930 | NC | NC | NC |
| P.31 | 331 | | 931 | NC | NC | NC |
| P.32 | 332 | | 932 | GRND | NC | GRND |
| P.33 | 333 | | 933 | NC | NC | NC |
| P.34 | 334 | | 934 | NC | NC | NC |
| P.35 | 335 | | 935 | GRND | NC | GRND |
| P.36 | 336 | | 936 | NC | NC | USB 2.0+ |
| P.37 | 337 | | 937 | NC | NC | USB 2.0- |
| P.38 | 338 | 738 | 938 | GRND | GRND | GRND |
| P.39 | 339 | 739 | 939 | HPD1B | HPD1B | HPD1B |
| P.40 | 340 | 740 | 940 | POWER | POWER | POWER |

FIG. 13A

1300

| PIN | CONN. 100 | CONN. 500 | CONN. 900 | CONFIG.D | CONFIG.E | CONFIG.F |
|---|---|---|---|---|---|---|
| P.1 | 301 | 701 | 901 | POWER | POWER | POWER |
| P.2 | 302 | 702 | 902 | HPD1A | HPD1A | HPD1A |
| P.3 | 303 | 703 | 903 | GRND | GRND | GRND |
| P.4 | 304 | | 904 | USB3 SS Rx+ | SERIAL LANE0A+ | USB3 SS Rx+ |
| P.5 | 305 | | 905 | USB3 SS Rx- | SERIAL LANE0A- | USB3 SS Rx- |
| P.6 | 306 | | 906 | GRND | GRND | GRND |
| P.7 | 307 | | 907 | USB3 SS Tx+ | SERIAL LANE1A+ | USB3 SS Tx+ |
| P.8 | 308 | | 908 | USB3 SS Tx- | SERIAL LANE1A- | USB3 SS Tx- |
| P.9 | 309 | | 909 | GRND | GRND | GRND |
| P.10 | 310 | | 910 | NC | NC | DP LANE3+ |
| P.11 | 311 | | 911 | NC | NC | DP LANE3 |
| P.12 | 312 | | 912 | GRND | GRND | GRND |
| P.13 | 313 | | 913 | NC | NC | DP HPD |
| P.14 | 314 | | 914 | NC | NC | RFU |
| P.15 | 315 | | 915 | GRND | GRND | GRND |
| P.16 | 316 | | 916 | USB 2.0+ | SERIAL LANE4A+ | USB 2.0+ |
| P.17 | 317 | | 917 | USB 2.0- | SERIAL LANE4A- | USB 2.0- |
| P.18 | 318 | 718 | 918 | GRND | GRND | GRND |
| P.19 | 319 | 719 | 919 | HPD2A | HPD2A | HPD2A |
| P.20 | 320 | 720 | 920 | POWER | POWER | POWER |
| P.21 | 321 | 721 | 921 | POWER | POWER | POWER |
| P.22 | 322 | 722 | 922 | HPD2B | HPD2B | HPD2B |
| P.23 | 323 | 723 | 923 | GRND | GRND | GRND |
| P.24 | 324 | | 924 | NC | SERIAL LANE0B+ | DP LANE0+ |
| P.25 | 325 | | 925 | NC | SERIAL LANE0B- | DP LANE0- |
| P.26 | 326 | | 926 | GRND | GRND | GRND |
| P.27 | 327 | | 927 | NC | SERIAL LANE1B+ | DP LANE1+ |
| P.28 | 328 | | 928 | NC | SERIAL LANE1B- | DP LANE1- |
| P.29 | 329 | | 929 | GRND | GRND | GRND |
| P.30 | 330 | | 930 | NC | NC | DP LANE2+ |
| P.31 | 331 | | 931 | NC | NC | DP LANE2- |
| P.32 | 332 | | 932 | GRND | GRND | GRND |
| P.33 | 333 | | 933 | NC | NC | DP CONFIG1 |
| P.34 | 334 | | 934 | NC | NC | RFU |
| P.35 | 335 | | 935 | GRND | GRND | GRND |
| P.36 | 336 | | 936 | NC | SERIAL LANE4B+ | AUX+ |
| P.37 | 337 | | 937 | NC | SERIAL LANE4B- | AUX- |
| P.38 | 338 | 738 | 938 | GRND | GRND | GRND |
| P.39 | 339 | 739 | 939 | HPD1B | HPD1B | HPD1B |
| P.40 | 340 | 740 | 940 | POWER | POWER | POWER |

FIG. 13B

1300

| PIN | CONN. 100 | CONN. 500 | CONN. 900 | CONFIG.G | CONFIG.H |
|---|---|---|---|---|---|
| P.1 | 301 | 701 | 901 | POWER | POWER |
| P.2 | 302 | 702 | 902 | HPD1A | HPD1A |
| P.3 | 303 | 703 | 903 | GRND | GRND |
| P.4 | 304 | | 904 | SERIAL LANE0A+ | USB3 SS Rx+ |
| P.5 | 305 | | 905 | SERIAL LANE0A- | USB3 SS Rx- |
| P.6 | 306 | | 906 | GRND | GRND |
| P.7 | 307 | | 907 | SERIAL LANE1A+ | USB3 SS Tx+ |
| P.8 | 308 | | 908 | SERIAL LANE1A- | USB3 SS Tx- |
| P.9 | 309 | | 909 | GRND | GRND |
| P.10 | 310 | | 910 | SERIAL LANE2A+ | DP LANE3+ |
| P.11 | 311 | | 911 | SERIAL LANE2A- | DP LANE3- |
| P.12 | 312 | | 912 | GRND | GRND |
| P.13 | 313 | | 913 | SERIAL LANE3A+ | DP HPD |
| P.14 | 314 | | 914 | SERIAL LANE3A- | RFU |
| P.15 | 315 | | 915 | GRND | GRND |
| P.16 | 316 | | 916 | SERIAL LANE4A+ | USB 2.0+ |
| P.17 | 317 | | 917 | SERIAL LANE4A- | USB 2.0- |
| P.18 | 318 | 718 | 918 | GRND | GRND |
| P.19 | 319 | 719 | 919 | HPD2A | HPD2A |
| P.20 | 320 | 720 | 920 | POWER | POWER |
| P.21 | 321 | 721 | 921 | POWER | POWER |
| P.22 | 322 | 722 | 922 | HPD1B | HPD1B |
| P.23 | 323 | 723 | 923 | GRND | GRND |
| P.24 | 324 | | 924 | SERIAL LANE0B+ | DP LANE0+ |
| P.25 | 325 | | 925 | SERIAL LANE0B- | DP LANE0- |
| P.26 | 326 | | 926 | GRND | GRND |
| P.27 | 327 | | 927 | SERIAL LANE1B+ | DP LANE1+ |
| P.28 | 328 | | 928 | SERIAL LANE1B- | DP LANE1- |
| P.29 | 329 | | 929 | GRND | GRND |
| P.30 | 330 | | 930 | SERIAL LANE2B+ | DP LANE2+ |
| P.31 | 331 | | 931 | SERIAL LANE2B- | DP LANE2- |
| P.32 | 332 | | 932 | GRND | GRND |
| P.33 | 333 | | 933 | SERIAL LANE3B+ | CONFIG1 |
| P.34 | 334 | | 934 | SERIAL LANE3B- | RFU |
| P.35 | 335 | | 935 | GRND | GRND |
| P.36 | 336 | | 936 | SERIAL LANE4B+ | AUX+ |
| P.37 | 337 | | 937 | SERIAL LANE4B- | AUX- |
| P.38 | 338 | 738 | 938 | GRND | GRND |
| P.39 | 339 | 739 | 939 | HPD2B | HPD2B |
| P.40 | 340 | 740 | 940 | POWER | POWER |

FIG. 13C

ELECTRONIC CONNECTOR

CROSS REFERENCE TO RELATED APPLICATIONS

This application is a continuation of U.S. patent application Ser. No. 14/272,361, filed on May 7, 2014, and titled "ELECTRONIC CONNECTOR," the entire disclosure of which is hereby incorporated herein by reference.

BACKGROUND

Electronic devices often include hardware interfaces in the form of electronic connectors for exchanging electrical power, a ground reference, and/or communication signals with external systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

According to an embodiment of this disclosure, a male electronic connector includes a base and a tapered extension protruding from the base. The tapered extension includes a nose that forms a terminal end of the tapered extension. A first connection face and a second connection face of the tapered extension taper toward each other from the base to the nose symmetrically about a first symmetry plane.

The tapered extension further includes a first flank surface and a second flank surface that form respective opposing sides of the tapered extension between the first connection face and the second connection face. The first flank surface and the second flank surface may also taper toward each other from the base to the nose symmetrically about a second symmetry plane that is orthogonal to the first symmetry plane.

The tapered extension further includes power and ground electrical contacts located along the first and second connection faces.

BRIEF DESCRIPTION OF THE DRAWINGS

FIG. 1 depicts an example male electronic connector having a first configuration.

FIG. 2 depicts the example electronic connector of FIG. 1 as viewed along the X-coordinate axis.

FIG. 3 depicts the example electronic connector of FIG. 1 as viewed along the Z-coordinate axis.

FIG. 4 depicts the example electronic connector of FIG. 1 as viewed along the Y-coordinate axis.

FIG. 5 depicts another example male electronic connector having a second configuration.

FIG. 6 depicts the example electronic connector of FIG. 5 as viewed along the X-coordinate axis.

FIG. 7 depicts the example electronic connector of FIG. 5 as viewed along the Z-coordinate axis.

FIG. 8 depicts the example electronic connector of FIG. 5 as viewed along the Y-coordinate axis.

FIG. 9 depicts an example female electronic connector having a third configuration compatible with both the male electronic connector of FIGS. 1-4 and the male electronic connector of FIGS. 5-8.

FIG. 10 depicts a cutaway view of the example electronic connector of FIG. 9.

FIG. 11 depicts an electronic connector pair interfacing with each other to form one or more electrical connections.

FIG. 12 depicts another example electronic connector pair having inclined connection surfaces.

FIGS. 13A, 13B, and 13C are tables depicting example pin-out configurations for three different electronic connectors.

DETAILED DESCRIPTION

Figure 14:
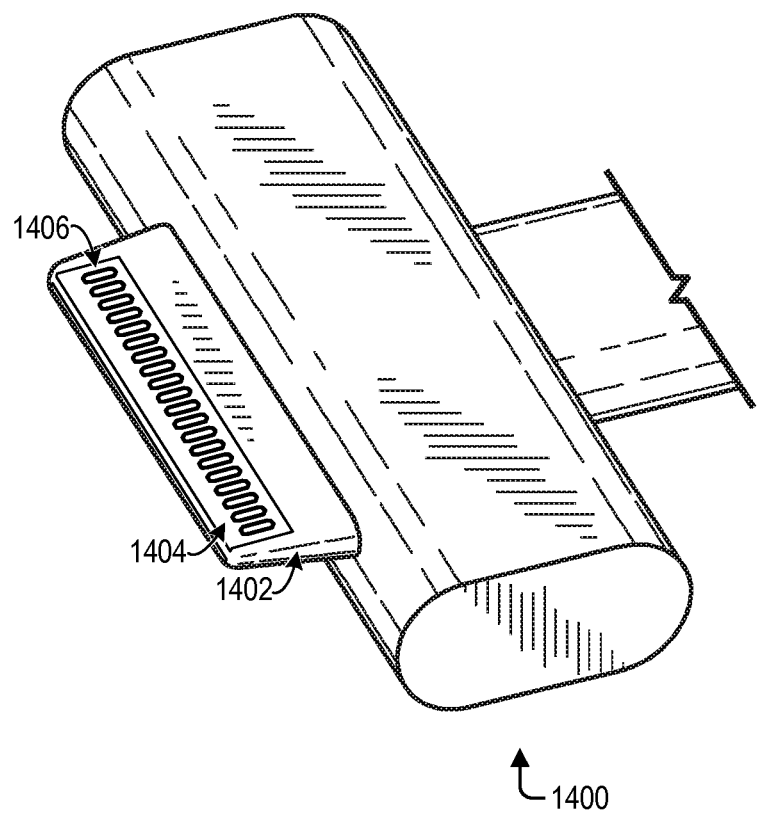
FIG. 14 depicts an example male electronic connector with an electrically conductive fang.

Paired electronic connectors may include a male electronic connector having a tapered extension that projects outward along a connection axis, and a corresponding female electronic connector having a receptacle that accommodates the tapered extension. The tapered extension may be self-aligning within the receptacle, thereby providing an improved user experience for establishing an electrical connection between the paired electronic connectors. Tapered connection faces of the tapered extension may also serve to reduce connector depth along the connection axis for a given type of connection as compared to parallel connection faces, thereby reducing the size of the connector form factor.

Magnetically attractable elements optionally may be incorporated into the paired electronic connectors to further assist with the alignment and connection of male and female electronic connectors.

When a taper is employed, the nose of the male electronic connector is smaller than an opening of the female electronic connector. This size difference creates a relatively large attachment tolerance that can make it easier to insert the male electronic connector into the female electronic connector. Furthermore, the magnetically attractable elements help the connection come together with very little effort. The taper and the magnetic nature of the connection can provide a sensation of the male and female electronic connectors flying together.

The paired electronic connectors and associated electronic control circuitry may support two or more connection orientations, which may further improve user experience for establishing an electrical connection because the user may insert the male connector in a variety of orientations without stopping to consider which orientation is correct.

An electronic connector optionally includes an electrical ground conductor body located within the electronic connector. The electrical ground conductor body is electrically connected to two or more electrical ground contacts of the electrical connector. For example, the electrical ground conductor body may be electrically connected to a plurality of electrical ground contacts distributed among other non-ground contacts of the electronic connector. The electrical ground conductor body may serve to reduce impedance discontinuities across plural ground contacts, and/or improve signal integrity, enabling higher data transfer rates. The electronic ground conductor body may be used in combination with a male electronic connector having a tapered extension and/or a female electronic connector that accommodates a tapered extension of a male electronic connector. The ground conductor body may be positioned on a plane of symmetry between opposing connection faces.

A female electronic connector may accommodate and interface with a range of differently configured male electronic connectors. As one example, a female electronic connector accommodates and interfaces with each of a first male electronic connector that exchanges electrical power with the female electronic connector, and a second male electronic connector that exchanges electrical power and one or more additional or different signal paths with the female electronic connector as compared to the first male electronic connector. Alternatively or additionally, the first male electronic connector and the second male electronic connector may have different shapes and/or sizes relative to each other.

FIGS. 1-4 depict an example electronic connector 100 having a first configuration. Electronic connector 100 includes a base 110 and a tapered extension 112 that protrudes from base 110 along a connection axis 102. Tapered extension 112 includes a nose 114 that forms a terminal end of tapered extension 112. Electronic connector 100 may include or interface with a connector cable 116 that includes one or more electrically conductive wires for transmitting electrical power, ground, and/or electrical signals to and/or from a set of electrical contacts 118.

Electronic connector 100 may take the form of a male electronic connector that is configured, for example, to interface with a corresponding female electronic connector to form one or more electrical connections across the set of electrical contacts 118. As one example, electronic connector 100 may be mated to or unmated from another corresponding electronic connector (e.g., female electronic connector 900 of FIG. 9) along connection axis 102.

In FIG. 1, for example, connection axis 102 includes an arrow that represents a direction along connection axis 102 that electronic connector 100 may be connected to another corresponding electronic connector. Electronic connector 100 may be disconnected by withdrawing electronic connector 100 relative to the other electronic connector along connection axis 102 in a direction that opposes the arrow depicted in FIG. 1. Connection axis 102 is parallel to or may be collinear with the Z-coordinate axis of the three-dimensional Cartesian coordinate system depicted in FIG. 1.

FIG. 2 depicts the example electronic connector 100 of FIG. 1 as viewed along the X-coordinate axis. Tapered extension 112 includes a first connection face 210 and a second connection face 220 that are inclined relative to each other. For example, first connection face 210 and second connection face 220 may taper toward each other from base 110 to nose 114. In at least some configurations, first connection face 210 and second connection face 220 taper toward each other symmetrically about a first symmetry plane 230 that is parallel to or co-planar with an XZ-coordinate plane. Within FIG. 2, connection axis 102 is parallel to and contained within first symmetry plane 230.

FIG. 2 depicts first connection face 210 having a first taper angle 212 measured relative to connection axis 102. FIG. 2 further depicts second connection face 220 including a second taper angle 222 measured relative to connection axis 102. For configurations in which first and second connection faces taper toward each other symmetrically, a magnitude of each taper angle relative to a particular reference may be identical for both connection faces. Therefore, a magnitude of first taper angle 212 is equal to a magnitude of second taper angle 222 in the example depicted in FIG. 2.

As an example, first taper angle 212 and second taper angle 222 each have a magnitude of 4 degrees. As another example first taper angle 212 and second taper angle 222 may have a magnitude that is selected from the range 3 degrees-5 degrees. In yet another example, first taper angle 212 and second taper angle 222 may have a magnitude that is selected from the range 1 degree-10 degrees. In still further examples, first taper angle 212 and second taper angle 222 may have a magnitude that is selected from the range >0 degrees-45 degrees. In at least some use-scenarios, a smaller taper angle relative to the connection axis may advantageously provide greater connection depth and/or connector retention by a female connector, while a larger taper angle relative to the connection axis may advantageously reduce connector depth and/or assist in connector mating with a female connector. A lesser taper angle may also allow for a relatively smaller opening in the Y dimension of a corresponding female connector, thus increasing options for small device size and/or female connector placement.

A tapered extension may include first and second connection faces having other suitable taper angles. In other configurations, for example, first and second connection faces may be inclined relative to each other, but may have taper angles of different magnitudes relative to a common reference (i.e., asymmetrical tapers). In asymmetrical configurations, a first connection face may be inclined at a greater angle than a second connection face.

FIG. 2 further depicts an edge profile of nose 114 in further detail. In at least some configurations, an edge profile of nose 114 if viewed along the X-coordinate axis may take the form of a semi-circle that interfaces with first connection face 210 and second connection face 220. A semi-circle of the nose may have a constant radius or may take other suitable forms. The nose may alternatively have a curved but non-circular edge profile, a polygonal edge profile, a pointed edge profile or triangular terminal end, or any other edge profile.

FIG. 3 depicts the example electronic connector 100 of FIG. 1 as viewed along the Z-coordinate axis. In the depicted configuration, first connection surface 210 and second connection surface 220 are each symmetric about a second symmetry plane 360. In this example, second symmetry plane 360 bisects first connection surface 210 and second connection surface 220. In other configurations, first connection surface 210 and/or second connection surface 220 may be asymmetric about second symmetry plane 360.

FIG. 3 further depicts a configuration in which the set of electrical contacts 118 of electronic connector 100 is divided into a first subset of electrical contacts 352 located along first connection face 210, and a second subset of electrical contacts 354 located along second connection face 220. The arrangement of electrical contacts depicted in FIG. 3 is an example of an electrical contact configuration for an electronic connector. Other suitable electrical contact configurations may be used.

The first and second subsets of electrical contacts may include any suitable quantity of electrical contacts. As one example, each connection face may include six or less, eight, ten, twelve, fourteen, sixteen, eighteen, twenty, or even greater quantities of electrical contacts. Symmetrical configurations will generally include an even number of electrical contacts, although symmetrical configurations may include an odd number of electrical contacts with a centered ground contact. Asymmetrical even and odd number configurations are within the scope of this disclosure and may provide a mechanism for detecting male connector orientation.

In at least some configurations, the first and second subsets of electrical contacts may each have the same quantity of electrical contacts. FIG. 3 depicts an example in which the first subset of electrical contacts 352 includes twenty electrical contacts indicated by reference numerals 321-340 (ordered sequentially from left to right), and the second subset of electrical contacts 354 also includes twenty electrical contacts indicated by reference numerals 301-320 (ordered sequentially from right to left). In another configuration, a first set of electrical contacts may include six electrical contacts and a second set of electrical contacts may also include six electrical contacts, as depicted in FIGS. 5-8, for example.

In other configurations, first and second subsets of electrical contacts may have different quantities of electrical contacts relative to each other. As one example, a first subset of electrical contacts located along a first connection face may include two or more electrical contacts, and a second subset of electrical contacts located along a second connection face may include fewer electrical contacts than the first subset of electrical contacts. In at least some configurations, the second subset of electrical contacts may be omitted, for example, so that zero electrical contacts are located along second connection face 220.

In at least some configurations, outward facing surfaces of the first subset of electrical contacts 352 may be flush with first connection face 210, and outward facing surfaces of the second subset of electrical contacts 354 may be flush with second connection face 220. Flush connection faces may provide smooth insertion of the electronic connector into a receptacle of another electronic connector or withdrawal of the electronic connector from the receptacle. Flush connection faces may also improve connector cleanliness and facilitate connector cleaning. Such cleaning may be manual or due to, for example, friction during insertion and withdrawal. In other configurations, outward facing surfaces of electrical contacts may be recessed or protrude relative to the first and second connection faces.

Electrical contacts may have any suitable shape and/or size. In the example depicted in FIGS. 1-4, externally facing connection surfaces of the electrical contacts have a flat rectangular shape. However, an externally facing connection surface of an electrical contact may have other suitable shapes, including circles, ovals, multi-sided two-dimensional shapes, multi-sided three-dimensional shapes, etc. The electrical contacts depicted in FIGS. 1-4 are of similar shape and size in relation to each other. In other configurations, electrical contacts of an electronic connector may have different shapes and/or sizes in relation to each other.

In at least some configurations, the first subset of electrical contacts 352 may be evenly spaced apart from each other along the first connection face 210 as measured along the X-coordinate axis. The second subset of electrical contacts 354 may also be evenly spaced apart from each other along second connection face 220 as measured along the X-coordinate axis. In a further example, two middle electrical contacts along a connection face may be equally spaced from second symmetry plane 360, the outer electrically contacts along the connection face may be equally spaced from second symmetry plane 360, and other intermediate electrical contacts along the connection face may be paired with a symmetric electrical contact located on an opposite side of second symmetry plane 360 that is equally spaced from second symmetry plane 360. In other configurations, electrical contacts may not be evenly spaced apart from each other along first and/or second connection faces to provide any number of symmetric or asymmetric contact configurations.

In at least some configurations, the first subset of electrical contacts 352 are arranged symmetrically along first connection face 210 about second symmetry plane 360. In the example depicted in FIG. 3, second symmetry plane 360 is orthogonal to first symmetry plane 230, and additionally contains connection axis 102 and is parallel to or coplanar with the YZ-coordinate plane. In the example depicted in FIG. 3, ten electrical contacts (or half of electrical contacts 352) are located along first connection face 210 on one side of second symmetry plane 360, and another ten electrical contacts (or half of electrical contacts 352) are located along first connection face 210 on an opposite side of second symmetry plane 360. In other configurations, a different quantity of electrical contacts may be located along first connection face 210 on either side of symmetry plane 360 in a symmetric or asymmetric arrangement.

The second subset of electrical contacts 354 may also be arranged symmetrically along second connection face 220 about second symmetry plane 360. In the example depicted in FIG. 3, ten electrical contacts (or half of electrical contacts 354) are located along second connection face 220 on one side of second symmetry plane 360, and another ten electrical contacts (or half of electrical contacts 354) are located along second connection face 220 on an opposite side of second symmetry plane 360. In other configurations, a different quantity of electrical contacts may be located along second connection face 220 on either side of symmetry plane 360 in a symmetric or asymmetric arrangement.

In at least some configurations, the first subset of electrical contacts 352 and the second subset of electrical contacts 354 may be arranged symmetrically about first symmetry plane 230. For example, FIG. 3 depicts each electrical contact of the first subset of electrical contacts 352 being aligned with a corresponding electrical contact of the second subset of electrical contacts 354 along the X-coordinate axis. For example, electrical contact 301 is aligned with electrical contact 340, and electrical contact 320 is aligned with electrical contact 321 in this arrangement. In other configurations, the first subset of electrical contacts 352 and the second subset of electrical contacts 354 may be arranged asymmetrically about first symmetry plane 230, such that one or more of electrical contacts 352 are not aligned with one or more electrical contacts 354 along the X-coordinate axis. In some asymmetrical configurations, one of the connection faces may not include any electrical contacts.

FIG. 4 depicts the example electronic connector 100 of FIG. 1 as viewed along the Y-coordinate axis. FIG. 4 further depicts an example in which the electrical contacts are aligned with one another between flank surfaces. For example, first subset of electrical contacts 352 has a straight-line alignment along first connection face 210 that is parallel to the terminal end of the tapered extension formed by nose 114. In this example, the first subset of electrical contacts 352 is aligned along a straight line that is parallel to the X-coordinate axis. The second subset of electrical contacts 354 may similarly have a straight-line alignment along second connection face 220 that is parallel to the terminal end of the tapered extension. In other configurations, electrical contacts may have other suitable alignments along a connection face, such as, for example, convex, concave, or staggered alignments relative to the terminal end of the tapered extension.

In at least some configurations, each electrical contact of the set of electrical contacts 118 may be offset by the same distance 410 from the terminal end of the tapered extension formed by nose 114. In other configurations, electrical contacts located along a connection face may be offset by different distances relative to each other from the terminal end of the tapered extension and/or electrical contacts located on different connection faces may be offset by different distances relative to each other from the terminal end of the tapered extension. This may be advantageous in making a ground or power contact ahead of a signal contact, for example, in order to help limit arcing and/or electrostatic discharge events during attach and/or detach.

FIG. 4 further depicts tapered extension 112 including a first flank surface 420 and a second flank surface 430. First flank surface 420 and second flank surface 430 form respective opposing sides of tapered extension 112 between first connection face 210 and second connection face 220. As one example, first flank surface 420 and second flank surface 430 have curved outward facing edge profiles as viewed along the Z-coordinate axis of FIG. 3, and have straight or flat outward facing edge profiles as viewed along the Y-coordinate axis of FIG. 4. In other configurations, flank surfaces may have curved and/or multi-faced edge profiles as viewed along the Y-coordinate axis, straight or multi-faced edge profiles as viewed along the Z-coordinate axis, and/or different edge profiles relative to each other.

FIG. 4 depicts first flank surface 420 and second flank surface 430 tapering toward each other from base 110 to nose 114. In one example, first flank surface 420 and second flank surface 430 taper toward each other symmetrically about second symmetry plane 360. For example, FIG. 4 depicts outward facing edge profiles of first flank surface 420 and second flank surface 430. In a symmetric configuration, a magnitude of a taper angle 422 of first flank surface 420 is equal to a magnitude of a taper angle 432 of second flank surface 430. In FIG. 4, taper angles 422 and 432 are measured relative to the outward facing edge profiles of the respective flank surfaces and to respective reference axes that are parallel to both the connection axis 102 and the Z-coordinate axis. Flank surface taper angle(s) may be the same as, greater than, or less than connection surface taper angle(s).

As a non-limiting example, taper angles 422 and 432 have a magnitude of 6 degrees. As another example, taper angles 422 and 432 have a magnitude of 10 degrees. In yet another example, taper angles 422 and 432 have a magnitude that is selected from the range 6 degrees-10 degrees. In further examples, taper angles 422 and 432 have a magnitude that is selected from the range >0-45 degrees. In other configurations, taper angle 422 may be greater than or less than taper angle 432. In still other configurations, one or both of taper angles 422 and 432 may be zero degrees or parallel to each other and connection axis 102. In this configuration, flank surfaces are not inclined relative to each other, and provide parallel side walls of the tapered extension. In one alternative, the parallel side walls may have a non-zero angle with respect to connection axis 102 to provide increased mechanical retention between the male and female connectors. In at least some use-scenarios, a smaller taper angle relative to the connection axis may advantageously provide greater connection depth and/or connector retention by a female connector, while a larger taper angle relative to the connection axis may advantageously reduce connector size and/or assist in connector mating with a female connector. A lesser taper angle may also allow for a relatively smaller opening in the X dimension of a corresponding female connector, thus increasing options for small device size and/or female connector placement.

Flank surfaces may be symmetric or asymmetric about first symmetry plane 230. Flank surfaces 420 and 430 are each symmetric about first symmetry plane 230 in the depicted configuration. In this example, first symmetry plane 230 bisects first flank surface 420 and second flank surface 430.

Connection faces 210 and 220, flank surfaces 420 and 430, and nose 114 may collectively form a shell or frame of electronic connector 100. In at least some configurations, this shell or frame may take the form of a single integrated component formed from a common material or combination of materials. As an example, this shell or frame may be formed from a polymer. However, other suitable materials may be used.

First connection face 210 and second connection face 220 may define openings or windows within the shell or frame that are occupied by electrical contacts 118. For example, first connection face 210 may define a first subset of openings or windows in the shell or frame that are occupied by the first subset of electrical contacts 352, and second connection face 220 may define a second subset of openings or windows in the shell or frame that are occupied by the second subset of electrical contacts 354.

Base 110 may also form part of the shell or frame of electronic connector 100 in some configurations, and may be combined with connection faces 210 and 220, flank surfaces 420 and 430, and nose 114 into a single integrated component formed from a common material or combination of materials. In other configurations, base 110 may form a separate component from tapered extension 112, and may be formed from the same or different material than tapered extension 112.

Electrical contacts may be formed from any suitable electrically conductive material or combination of materials. Examples of electrically conductive materials include metals, such as gold, copper, silver, and aluminum. However, electrical contacts may be formed from other suitable electrically conductive materials or combinations of materials. Within the context of electronic connector 100, for example, electrical contacts may be formed from a material or combination of materials that serve as a better electrical conductor than a material or combination of materials that form first connection face 210 and second connection face 220 of tapered extension 112. First connection face 210 and second connection face 220 may be formed from any suitable material or combination of materials (e.g., a polymer) that serve as an electrical insulator between individual electrical contacts.

An electronic connector, such as example electronic connector 100, may be constructed using a variety of manufacturing techniques including, as non-limiting examples: plastic injection molding, inset molding, and overmolding for tapered extension and base components of the electronic connector; and metal blanking, forming, and stamping for electrical contacts, the electrical ground conductor body, and other conductive components. Manual and/or automated assembly processes may be used to combine connector components. As one example, the electrical ground conductor body may be constructed from sheet metal along with two subsets of inset-molded electrical contacts (e.g., subsets of electrical contacts 352 and 354) may be overmolded with plastic or may be inserted into a separate molded part (e.g., MIM), and then overmolded with plastic to create continuous smooth outer surfaces of the tapered extension. The back end of the contacts then may be soldered to a paddle card (e.g., PCB) or wired directly to cable wires. The base of the electronic connector and paddle card then may be overmolded with plastic.

In at least some configurations, electronic connector 100 further includes one or more magnetically attractable elements. As one example, FIGS. 3 and 4 depict electronic connector 100 including a first magnetically attractable element 372 and a second magnetically attractable element 374 included on or within base 110. These magnetically attractable elements may be aligned with and correspond to magnetically attractable elements included on or within a corresponding electronic connector with which electronic connector 100 is configured to form an electrical connection (e.g., female electronic connector 900 of FIG. 9).

A magnetically attractable element may include a permanent magnet, an electromagnet, and/or a material that is attracted by another magnet. A non-limiting example of a permanent magnet includes rare earth magnets. However, other suitable permanent magnets may be used. Examples of materials that are attracted by magnets include at least some forms of steel, iron, nickel, cobalt, and certain rare earth metals.

While electronic connector 100 is depicted as including two magnetically attractable elements, an electronic connector, such as example electronic connector 100 may include any suitable quantity of magnetically attractable elements, including one, two, three, four, or more magnetically attractable elements. When two or more magnetically attractable elements are included, individual magnetically attractable elements may be located on both sides of the second symmetry plane 360.

First magnetically attractable element 372 and second magnetically attractable element 374 are configured to cooperate with one or more corresponding magnetically attractable elements of a paired electronic connector to magnetically hold electronic connector 100 in place while interfacing with that paired electronic connector. FIG. 11 depicts an example of two paired electronic connectors having corresponding magnetically attractable elements. In at least some configurations, an individual magnetically attractable element of an electronic connector may be configured to cooperate at the same time with two or more magnetically attractable elements of a paired electronic connector. For example, first magnetically attractable element 372 and second magnetically attractable element 374 simultaneously may be attracted to and retained by a common magnetically attractable element of a paired electronic connector.

In one example, first magnetically attractable element 372 and second magnetically attractable element 374 may be located within base 110. In this example, first magnetically attractable element 372 and second magnetically attractable element 374 may be hidden behind connection surface 380 of base 110. In another example, first magnetically attractable element 372 and second magnetically attractable element 374 may be included on base 110 where they may be exposed to one or more magnetically attractable elements of a corresponding electronic connector. In this example, outward facing surfaces of first magnetically attractable element 372 and second magnetically attractable element 374 may be flush with a connection surface 380 of base 110, may be recessed relative to connection surface 380, or may protrude relative to connection surface 380.

One or more magnetically attractable elements may alternatively or additionally be included on or within tapered extension 112. In one example, one or more magnetically attractable elements may be included on or within nose 114 of tapered extension 112, including configurations in which outward facing surfaces of the magnetically attractable elements are flush with a connection surface of the nose, recessed relative to the connection surface of the nose, protrude relative to the connection surface of the nose, or are hidden behind the connection surface of the nose.

A permanent magnet or electromagnet forming a magnetically attractable element of an electronic connector may have a polarity that corresponds to or is paired with an inverse polarity or an attractable polarity of another magnet of a paired electronic connector. Magnetic polarity may be used, in at least some implementations, to enforce a particular connection orientation or preclude an incorrect connection orientation between paired electronic connectors.

As one example, first magnetically attractable element 372 may have a first polarity and second magnetically attractable element 374 may have a second polarity that differs from the first polarity. In this example, a paired electronic connector may include a corresponding magnetically attractable element having a polarity that is attracted to the first polarity of first magnetically attractable element 372 and another magnetically attractable element having a polarity that is repelled by first magnetically attractable element 372. Continuing with this example, the second polarity of second magnetically attractable element 374 may be attracted to the magnetically attractable element of the paired electronic connector that was repelled by the first magnetically attractable element 372. However, for implementations in which paired electronic connectors include two or more connection orientations (e.g., reversible connectors), first magnetically attractable element 372 and second magnetically attractable element 374 may have the same or similar polarity. In such case, the paired electronic connector may have one or more corresponding magnetically attractable elements that are each attracted to first magnetically attractable element 372 and second magnetically attractable element 374 of electronic connector 100.

As another example, a magnetically attractable element may include a spatially varying polarity (e.g., bipolar) across an outward facing surface or connection face of that magnetically attractable element. For example, magnetically attractable element 372 may include a first polarity along a first portion of connection surface 380 and a second polarity that differs from the first polarity along a second portion of connection surface 380. Magnetically attractable element 374 may include a spatially varying polarity across connection surface 380 that is the same as or differs in orientation from magnetically attractable element 372 to provide a reversible or non-reversible electronic connector pair that includes corresponding magnetically attractable elements of the other electronic connector.

In at least some configurations, electronic connector 100 further includes an electrical ground conductor body that is electrically connected to one or more electrical contacts of the electronic connector. As one example, FIGS. 2 and 4 further depict electronic connector 100 including electrical ground conductor body 240. An electrical ground conductor body of an electronic connector may serve to reduce impedance discontinuities and/or improve signal integrity, particularly at higher data transfer rates (e.g., speeds of 5 Gbps as a non-limiting example) across an interface of paired electronic connectors.

Electrical ground conductor body 240 may be contained within at least a portion of tapered extension 112 and/or base 110. In one example, electrical ground conductor body 240 includes a flat conductive plate portion that is parallel to and near first symmetry plane 230. For example, the distances from the plate portion to the opposing connection faces may be near the same (i.e., less than 10% difference), and/or the distance from the plate portion to the first symmetry plane 230 may be substantially less than the distances from the plate portion to the connection faces (e.g., less than 10%). As a more particular example, the plate portion may be equidistant to the opposing connection faces. This flat conductive plate portion of electrical ground conductor body 240 may be coplanar with the first symmetry plane 230 and/or may contain connection axis 102 in at least some configurations, such as depicted in FIG. 2, for example. In such a configuration, opposing electrical contacts are equidistant from the ground conductor body, and impedance differences between the opposing electrical contacts are reduced or eliminated.

Electrical ground conductor body 240 may be electrically connected to at least one electrical ground contact of the first subset of electrical contacts 352 and at least one ground electrical contact of the second subset of electrical contacts 354. For example, electrical ground conductor body 240 may be electrically connected to two or more (i.e., plural) electrical ground contacts of the first subset of electrical contacts 352 and two or more (i.e., plural) electrical ground contacts of the second subset of electrical contacts 354. In a further example, electrical ground conductor body 240 may be electrically connected to each or every electrical ground contact of electronic connector 100. In a configuration with at least twelve electrical ground contacts on each connection face, an electrical ground conductor body may be electrically connected to at least twelve ground contacts of the first subset of electrical contacts and at least twelve ground contacts of the second subset of electrical contacts.

Electrical ground conductor body 240 may alternatively be connected to a voltage potential other than ground. For example, electrical ground conductor body 240 may be connected to a positive or negative voltage potential with respect to the ground potential in a device or with respect to earth ground.

In at least some configurations, electrical ground contacts may be distributed among electrical power contacts and electrical signal contacts in a manner that limits a distance between each non-ground contact and a nearest electrical ground contact to less than a defined quantity of intermediate non-ground contacts. As one example, electrical ground contacts may be distributed among electrical contacts 301-320 of first connection face 210 such that all non-ground contacts are separated from a nearest electrical ground contact by no more than one other non-ground contact. As another example, electrical ground contacts may be distributed among electrical contacts 321-340 of second connection face 220 so that all non-ground contacts are separated from a nearest electrical ground contact by no more than two other non-ground contacts. In another example, conductive vias, conduits, or channels may extend from the ground contacts to an electrical ground conductor body. In this way, a signal contact may be shielded on at least three sides by ground. Non-limiting examples of pin-out configurations for the set of electrical contacts 118 of electronic connector 100 are described in further detail with reference to FIGS. 13A, 13B, and 13C.

It will be appreciated in view of the previously described example configurations that reversibility of an electronic connector, such as example electronic connector 100, between two or more different connection orientations with a paired electronic connector may be achieved by inclusion of one or more symmetric features. Examples of symmetric features include: (1) symmetric connector geometries such as symmetric connection faces, symmetric flank surfaces, etc., (2) symmetric electrical contact arrangements, and/or (3) symmetric magnetically attractable elements about first symmetry plane 230 and/or second symmetry plane 360.

It will also be appreciated that non-reversibility of an electronic connector supporting only a single connection orientation with a paired electronic connector may be achieved by inclusion of one or more asymmetric features. These asymmetric features may be used to enforce a particular connection orientation or preclude an incorrect connection orientation between paired electronic connectors. Non-limiting examples of asymmetric features include: (1) asymmetric connector geometries such as asymmetric connection faces, asymmetric flank surfaces, etc., (2) asymmetric electrical contact arrangements, and/or (3) asymmetric magnetically attractable elements about first symmetry plane 230 and/or second symmetry plane 360.

FIG. 14 depicts an example electronic connector 1400 that includes an electrically conductive fang 1402. Conductive fang 1402 provides the same ground connection points as electrical contacts 122 and 124 of FIG. 1, but also allows a female electronic connector to ground the sides of the fang (e.g., via flank finger springs 1170 and 1180 of FIG. 11). Fang 1402 may be created by metal injection molding or another process out of a conductive material (e.g., aluminum, steel, etc.). A non-conductive separator 1404 may be fit around the various electrical contacts 1406 so as to prevent shorts between the contacts. The non-conductive separator 1404, electrical contacts 1406, and fang 1402 may be sized and positioned so as to create substantially smooth connection faces. In at least some examples, fang 1402 may additionally or alternatively serve to increase electromagnetic shielding of the connector.

FIGS. 5-8 depict an example electronic connector 500 having a second configuration. Electronic connector 500 is similar to previously described electronic connector 100 in many respects with the exception of differences in the tapered extension geometry and arrangement of electrical contacts. In this configuration, connection faces of the electronic connector each include a recessed region that separates electrical contacts along that connection face into two groups. In at least some implementations, these recessed regions may serve to reduce insertion friction while connecting the electronic connector, and may further enable reduction in the size and/or strength of magnetically attractable elements used to assist in establishing a connection with a paired electronic connector.

Electronic connector 500 may likewise take the form of a male electronic connector that is configured, for example, to interface with a corresponding female electronic connector to form one or more electrical connections across a set of electrical contacts 518. While electronic connector 500 is different from electronic connector 100 of FIG. 1, both connectors may be compatible with the same female connector (e.g., female electronic connector 900 of FIG. 9).

As one example, electronic connector 500 may be mated to or unmated from another corresponding electronic connector along a connection axis 502. In FIG. 2, for example, connection axis 502 includes an arrow that represents a direction along connection axis 502 by which electronic connector 500 interfaces with another electronic connector. Electronic connector 500 may be disconnected by withdrawing electronic connector 500 relative to the other electronic connector along connection axis 502 in a direction that opposes the arrow depicted in FIG. 5. Connection axis 502 is parallel to or collinear with the Z-coordinate axis of the three-dimensional Cartesian coordinate system depicted in FIG. 5.

Referring to FIG. 5, electronic connector 500 includes a base 510 and a tapered extension 512 that protrudes from base 510. Tapered extension 512 includes a nose 514 that forms a terminal end of tapered extension 512. Electronic connector 500 may include or interface with a connector cable 516 that includes one or more electrically conductive wires for transmitting electrical power, electrical signals, and/or a ground reference.

In the configuration depicted in FIGS. 5-8, base 510 of electronic connector 500 has a different shape than base 110 of electronic connector 100. For example, base 510 includes a circular barrel shape in which connector cable 516 interfaces with an end of the barrel formed by base 510. In contrast to base 110 of electronic connector 100, base 510 of electronic connector 500 includes or interfaces with a connector cable at a different orientation relative to the orientation of electronic connector 100. However, base 510 and base 110 may be interchangeable with each other, and other suitable connector cable orientations and/or base geometries may be utilized. In still other configurations, base 110 of electronic connector 100 and base 510 of electronic connector 500 may be integrated with or take the form of a chassis or body of an electronic device or docking station.

In at least some configurations, an electrical ground conductor body of an electronic connector, such as electronic connectors 100 or 500, may be electrically connected to one or more additional electrical contacts located along a nose of the electronic connector. FIG. 1 depicts an example in which electrical contacts 122 and 124 are located along nose 114. In this example, electrical contacts 122 and 124 include externally facing connection surfaces that are exposed to corresponding electrical contacts of a paired electronic connector. In at least some configurations, electrical contacts 122 and 124 are integrated with and form respective portions of an electrical ground conductor body contained at least partially within the tapered extension. An example of this configuration is described in further detail with reference to FIG. 11.

Nose 114 may define corresponding openings or windows occupied by electrical contacts 122 and 124. Externally facing connection surfaces of electrical contacts 122 and 124 may be flush with nose 114, may protrude relative to nose 114, or may be recessed relative to nose 114. In other configurations, electrical contacts 122 and/or 124 may be omitted (e.g., as depicted in FIG. 5), or a greater quantity of electrical contacts, including non-ground contacts, may be located along nose 114. While not shown in FIGS. 5-8, electronic connector 500 may optionally be configured with electrical contact(s) located along a nose of the electronic connector.

FIG. 6 depicts the example electronic connector 500 of FIG. 5 as viewed along the X-coordinate axis. Tapered extension 512 includes a first connection face 610 and a second connection face 620. First connection face 610 and second connection face 620 are inclined relative to each other, and taper toward each other symmetrically about a first symmetry plane 630 that is parallel to or co-planar with an XZ-coordinate plane. Connection axis 502 is contained within first symmetry plane 630. First connection face 610 has a first taper angle 612 measured relative to connection axis 502. Second connection face 620 has a second taper angle 622 measured relative to connection axis 502. Taper angles 612 and 622 have identical magnitudes in this symmetric configuration. Taper angles 612 and 622 may be the same as or may differ from previously described taper angles 212 and 222 of electronic connector 100.

FIG. 7 depicts the example electronic connector 500 of FIG. 5 as viewed along the Z-coordinate axis. In this example, first connection face 610 includes a first recessed region 790 that extends from the terminal end of protruding extension 512 at least part way toward base 510. In at least some configurations, first recessed region 790 may be symmetric about a second symmetry plane 760. In the example depicted in FIG. 7, second symmetry plane 760 is orthogonal to first symmetry plane 630, contains connection axis 502, and is parallel to or coplanar with the YZ-coordinate plane. In other configurations, first recessed region 790 may be asymmetric about second symmetry plane 760.

In the depicted configuration, first recessed region 790 is located between a first portion (e.g., half or other suitable quantity) of a first subset of electrical contacts 752 and another portion (e.g., half or other suitable quantity) of the first subset of electrical contacts 752. For example, FIG. 7 depicts three electrical contacts located along first connection face 610 on one side of first recessed region 790 and three electrical contacts located along first connection face 610 on another side of first recessed region 790.

Tapered extension 512 further includes a second recessed region 792 within second connection face 620 that extends from the terminal end of protruding extension 512 at least part way toward base 510. In this example, second recessed region 792 may be symmetric about second symmetry plane 760. In other configurations, second recessed region 792 may be asymmetric about second symmetry plane 760.

In the depicted configuration, second recessed region 792 is also located between a first portion (e.g., half or other suitable quantity) of a second subset of electrical contacts 754 and another portion (e.g., half or other suitable quantity) of the second subset of electrical contacts 754. For example, FIG. 7 depicts three electrical contacts located along second connection face 620 on one side of second recessed region 792 and three electrical contacts located along second connection face 620 on another side of second recessed region 792. Within FIG. 7, electrical contacts are indicated by reference numerals 701-703 and 718-720 (ordered from right to left) along second connection face 620, and by reference numerals 721-723 and 738-740 (ordered from left to right) along first connection face 610. Non-limiting examples of pin-out configurations for electrical contacts 518 of electronic connector 500 are described in further detail with reference to FIGS. 13A, 13B, and 13C.

In the depicted configuration, first recessed region 790 and second recessed region 792 are also symmetric about first symmetry plane 630. For example, FIG. 7 depicts the terminal end of tapered extension 512 formed by nose 514 as having thicker end portions (as measured along the Y-coordinate axis) containing electrical contacts on upper and lower connection faces. The thicker end portions are joined in the middle by a thinner interior region (as measured along the Y-coordinate axis) that does not contain electrical contacts. In other configurations, first recessed region 790 and second recessed region 792 may be asymmetric about first symmetry plane 630.

FIG. 8 further depicts tapered extension 512 including a first flank surface 820 and a second flank surface 830. First flank surface 820 and second flank surface 830 form respective opposing sides of tapered extension 512 between first connection face 610 and second connection face 620. As one example, first flank surface 820 and second flank surface 830 have curved outward facing edge profiles as viewed along the Z-coordinate axis of FIG. 7, and have straight or flat outward facing edge profiles as viewed along the Y-coordinate axis of FIG. 8. In other configurations, flank surfaces may have curved and/or multi-faced edge profiles as viewed along the Y-coordinate axis, straight or multi-faced edge profiles as viewed along the Z-coordinate axis, and/or different edge profiles relative to each other.

FIG. 8 depicts first flank surface 820 and second flank surface 830 tapering toward each other from base 510 to nose 514. In one example, first flank surface 820 and second flank surface 830 taper toward each other symmetrically about second symmetry plane 760. FIG. 8 depicts outward facing edge profiles of first flank surface 820 and second flank surface 830. In the depicted configuration, a magnitude of a taper angle 822 of first flank surface 820 is equal to a magnitude of a taper angle 832 of second flank surface 830. In FIG. 8, taper angles 822 and 832 are measured relative to the outward facing edge profiles of the respective flank surfaces and reference axes that are parallel to connection axis 502 and to the Z-coordinate axis.

Electronic connector 500 further includes one or more magnetically attractable elements. As one example, FIGS. 7 and 8 further depict electronic connector 500 including a first magnetically attractable element 772 and a second magnetically attractable element 774 included on or within base 510. Electronic connector 500 may include a different quantity and/or arrangement of magnetically attractable elements in other configurations.

Electronic connector 500 may further include an electrical ground conductor body, such as previously described with reference to electrical ground conductor body 240 of electronic connector 100. In at least some configurations, this electrical ground conductor body may have one or more portions that extend through nose 514 of electronic connector 500 or may be electrically connected to one or more outwardly facing electrical contacts located along nose 514.

FIG. 9 depicts an example electronic connector 900 having a third configuration as viewed along the Z-coordinate axis. Electronic connector 900 may take the form of a female electronic connector that is configured to interface with a corresponding male electronic connector to form one or more electrical connections. As an example, electronic connector 900 is configured to mate with previously described electronic connector 100 of FIG. 1 and/or previously described electronic connector 500 of FIG. 5. Accordingly, in at least some implementations, electronic connector 900 may take the form of a universal female electronic connector for an associated group of two or more male electronic connectors having different configurations.

Electronic connector 900 includes a connector body 950 that defines an opening 952 that serves as a receptacle for receiving a tapered extension of a corresponding male electronic connector. Tapered extension 112 of electronic connector 100 or tapered extension 512 of electronic connector 500 are non-limiting examples. FIG. 9 depicts a connection surface 954 of connector body 950 around opening 952.

Electronic connector 900 includes a set of electrical contacts 970 located within opening 952. Each of electrical contacts 970 may be configured to make contact with a corresponding electrical contact of a male electronic connector to establish one or more electrical connections across the connector pair. Non-limiting examples of pin-out configurations for electrical contacts 970 are described in further detail with reference to FIGS. 13A, 13B, and 13C.

Electrical contacts 970 may include a first subset of electrical contacts 972 and a second subset of electrical contacts 974. As an example, the first subset of electrical contacts 972 may include twenty electrical contacts, and the second subset of electrical contacts 974 may also include twenty electrical contacts. Individual electrical contacts of the second subset of electrical contacts 974 are labeled in FIG. 9 (from left to right) with reference numerals 901-920. Individual electrical contacts of the first subset of electrical contacts 972 are labeled in FIG. 9 (from right to left) with reference numerals 921-940.

Within the context of electronic connector 900 interfacing with electronic connector 100, for example, electrical contacts 901-920 interface with electrical contacts 301-320 respectively, and electrical contacts 921-940 interface with electrical contacts 321-340 respectively. In a reversible connector pair configuration electrical contacts 901-920 interface with electrical contacts 321-340 respectively, and electrical contacts 921-940 interface with electrical contacts 301-340 respectively.

Within the context of electronic connector 900 interfacing with electronic connector 500, electrical contacts 901-903 interface with electrical contacts 701-703 respectively, electrical contacts 918-920 interface with electrical contacts 718-720 respectively, electrical contacts 921-923 interface with electrical contacts 721-723 respectively, and electrical contacts 938-940 interface with electrical contacts 738-740 respectively. Electronic connector 500 may form a reversible connector pair with electronic connector 900 in at least some configurations.

Electronic connector 900 may further include one or more magnetically attractable elements included on or within connector body 950. For example, FIG. 9 depicts a first magnetically attractable element 956 located on a first side of opening 952 and a second magnetically attractable element 958 located on a second side of opening 952 opposite the first side. Magnetically attractable elements 956 and 958 may be aligned with and configured to attract corresponding magnetically attractable elements of example electronic connector 100 and/or electronic connector 500.

Opening 952 may be defined, at least in part, by one or more interior surfaces of connector body 950. In at least some configurations, one or more interior surfaces of connector body 950 may define an inverse of the shape of a tapered extension of a male electronic connector. These one or more interior surfaces may correspond to and/or accommodate one or more of the previously described first and second connection faces, first and second flank surfaces, and nose of electronic connectors 100 and 500, for example.

Within the context of electronic connector 900 interfacing with electronic connector 100, for example, connector body 950 may include one or more of: a first interior connection face 960 that forms a ceiling of opening 952 and which corresponds to and/or accommodates first connection face 210 of electronic connector 100, a second interior connection face 962 that forms a floor of opening 952 and which corresponds to and/or accommodates second connection face 220, a first interior flank surface 964 that forms a first side wall of opening 952 and which corresponds to and/or accommodates first flank surface 420, a second interior flank surface 966 that forms a second side wall of opening 952 and which corresponds to and/or accommodates second flank surface 430, an internal terminal end surface 968 that forms a terminal end of opening 952 and which corresponds to and/or accommodates nose 114. First interior connection face 960 may, for example, include the first subset of electrical contacts 972, and second interior connection face 962 may include the second subset of electrical contacts 974.

Some or all of these one or more interior surfaces or a portion thereof that forms opening 952 may contact some or all of the corresponding surfaces of a tapered extension of a male electronic connector while interfacing with that male electronic connector. Connection surface 954 of electronic connector 900 or a portion thereof may contact connection surface 380 of electronic connector 100 or a portion thereof when interfacing with electronic connector 100, for example.

Further, in at least some configurations, one or more of the previously described interior surfaces of opening 952 may include or may be augmented with one or more dynamic interface elements that contact one or more surfaces of a male electronic connector. As an example, one or more dynamic interface elements may include or take the form of finger springs or leaf springs.

FIGS. 10 and 11 depict examples of dynamic interface elements within the context of example electronic connector 900. FIG. 10 depicts a view of example electronic connector 900 revealing one or more interior surfaces of opening 952. Second interior connection face 962 is depicted in further detail in FIG. 10, and includes a set of connection face finger springs 1010.

Connection face finger springs 1010 include four individual finger springs in the depicted example. However, fewer or greater quantities of finger springs may be utilized. In the depicted example, each finger spring is spaced evenly apart from each other along connection face 962. However, other suitable spacings may be utilized, including even and/or uneven spacings of different sizes and arrangements. As further depicted in FIG. 10, each finger spring is aligned with and offset from connection surface 954 by the same distance. However, other suitable alignments and/or offsets may be utilized for connection face finger springs. For example, a set of connection face finger springs may utilize different offset distances for some or all of the finger springs as measured relative to connection surface 954.

In at least some configurations, connection face finger springs 1010 may be formed from and integrated with second interior connection face 962. An example finger spring 1014 includes a spring arm 1016 that is connected to the remaining portions of second interior connection face 962 by a joint 1018. Spring arm 1016 may be at least partially surrounded by an air gap 1020 formed by or within second interior connection face 962 to permit spring arm 1016 to deform and pivot about joint 1018. A terminal end of spring arm 1016 that opposes joint 1018 is depicted in FIG. 9 as being raised relative to other surround portions of second interior connection face 962. Upon a surface of a male electronic connector contacting and depressing the terminal end of spring arm 1016, the spring arm applies an opposing force to the surface of the male electronic connector that assists in retaining and/or aligning the male electronic connector within opening 952. The finger springs may also serve to make a ground contact between the connector shell and the device chassis. Finger springs may be integrally formed and/or created as separate parts attached to the interior connection face via laser welding or another attachment procedure.

Within the context of example electronic connector 100 of FIG. 1, for example, each of connection face finger springs 1010 may contact second connection face 220, at least within a region located between the second set of electrical contacts 354 and base 110 while electronic connector 100 is interfacing with and electrically connected to electronic connector 900.

In at least some configurations, first interior connection face 960 may include a set of connection face finger springs that mirrors and opposes the previously described connection face finger springs 1010 of second interior connection face 962. Finger springs located along the first and second interior connection faces may serve to retain and/or align a tapered extension of a male electronic connector within opening 952 through contact with connection faces. Finger springs located along the first and second interior connection faces may have a similar or dissimilar arrangement, or finger springs may be omitted from the first interior connection face and/or the second interior connection face. In other configurations, connection face finger springs may not be integrated with the interior connection faces, but may be instead fastened to the interior connection faces or may project through openings formed within the interior connection faces and into opening 952.

FIG. 10 further depicts a set of terminal end finger springs 1030 located along internal terminal end surface 968. This set of terminal end finger springs 1030 is depicted in further detail in FIG. 11.

FIG. 11 depicts an electronic connector pair 1100 in the form of a male electronic connector 1102 and previously described electronic connector 900 interfacing with each other to form one or more electrical connections. Electronic connector pair 1100 is viewed along the Y-coordinate axis in FIG. 11.

As an example, male electronic connector 1102 may take the form of previously described electronic connector 100 of FIG. 1 or electronic connector 500 of FIG. 5. Within this context, male electronic connector 1102 similarly includes a base 1110 and a tapered extension 1112 that protrudes from base 1110. Tapered extension 1112 includes a nose 1114 that forms a terminal end of tapered extension 1112.

Within FIG. 11, tapered extension 1112 has been received by electronic connector 900 through opening 952. For example, tapered extension 1112 may be inserted into opening 952 along a connection axis that is parallel to or collinear with the Z-coordinate axis depicted in FIG. 11.

Tapered extension 1112 may include a first flank surface 1116 and a second flank surface 1118. Male electronic connector 1102 further includes an electrical ground conductor body 1120 contained partially within tapered extension 1112 and partially within base 1110. Conductor body 1120 includes a first portion 1122 and a second portion 1124 that extend through nose 1114 and are exposed to electronic connector 900. Outwardly facing surfaces of first portion 1122 and second portion 1124 may take the form of electrical contacts.

In at least some configurations, electronic connector 900 also includes an electrical ground conductor body 1130. Conductor body 1130 may include the previously described set of terminal end finger springs 1030 of FIG. 10. In one example, terminal end finger springs 1030 may include a first terminal end finger spring 1140 and a second terminal end finger spring 1160. However, terminal end finger springs 1030 may include other suitable quantities of finger springs, or terminal end finger springs may be omitted in other configurations.

First terminal end finger spring 1140 includes a spring arm 1142 that is connected to the remaining portions of conductor body 1130 by a joint 1144. Spring arm 1142 may be at least partially surrounded by an air gap 1146 to permit spring arm 1142 to deform and pivot about joint 1144. A terminal end of spring arm 1142 may include an elbow 1148 that contacts first portion 1122 of conductor body 1120. For example, FIG. 11 depicts elbow 1148 projecting through an opening formed in internal terminal end surface 968 with elbow 1148 being contacted by first portion 1122 of male electronic connector 1102.

Second terminal end finger spring 1160 includes a spring arm 1162 that is connected to the remaining portions of conductor body 1130 by a joint 1164. Spring arm 1162 may be at least partially surrounded by an air gap 1166 to permit spring arm 1162 to deform and pivot about joint 1164. A terminal end of spring arm 1162 may include an elbow 1168 that contacts second portion 1124 of conductor body 1120. For example, FIG. 11 depicts elbow 1168 projecting through an opening formed in internal terminal end surface 968 with elbow 1168 being contacted by second portion 1124 of male electronic connector 1102.

Contact between conductor body 1120 and conductor body 1130, such as via the set of terminal end finger springs 1030, may be used to establish one or more electrical ground connections between male electronic connector 1102 and electronic connector 900. These one or more electrical ground connections may be in addition to or as an alternative to one or more electrical ground connections established between a set of electrical ground contacts of male electronic connector 1102 and a corresponding set of electrical ground contacts of electronic connector 900. Establishing a functionally continuous ground plane at the plane of symmetry helps maintain a very consistent impedance at the connector mating interfaces, thus improving signal integrity.

In at least some configurations, electronic connector 900 may include a set of flank finger springs that contact first flank surface 1116 and second flank surface 1118 of male electronic connector 1102. In one example, a set of flank finger springs may include a first flank finger spring 1170 and a second flank finger spring 1180. Flank finger springs may serve to retain and/or align tapered extension 1112 within opening 952 through contact with flank surfaces 1116 and 1118.

First flank finger spring 1170 includes a spring arm 1172 connected to the connector body by a joint 1174. Spring arm 1172 may be at least partially surrounded by an air gap 1176 to permit spring arm 1172 to deform and pivot about joint 1174. A terminal end of spring arm 1172 may include an elbow 1178 that contacts first flank surface 1116 of male electronic connector 1102. In one example, spring arm 1172 deforms and pivots upon first flank surface 1116 contacting elbow 1178, which in turn applies a force upon first flank surface 1116 that assists in retaining and/or aligning tapered extension 1112 within opening 952.

Second flank finger spring 1180 may likewise include a spring arm 1182 connected to the connector body by a joint 1184. Spring arm 1182 may be at least partially surrounded by an air gap 1186 to permit spring arm 1182 to deform and pivot about joint 1184. A terminal end of spring arm 1182 may likewise include an elbow 1188 that contacts second flank surface 1118 of male electronic connector 1102. In one example, spring arm 1182 deforms and pivots upon second flank surface 1118 contacting elbow 1188, which in turn applies a force upon second flank surface 1118 that assists in retaining and/or aligning tapered extension 1112 within opening 952.

In at least some configurations, first flank finger spring 1170 and second flank finger spring 1180 are able to accommodate a range of tapered extensions having different relative sizes and/or shapes. In one example, flank finger springs 1132 may accommodate flank surfaces of different male electronic connectors having different taper angles. As an example, flank finger springs 1132 may accommodate electronic connector 100 that includes flank surfaces having a taper angle selected from a range of 6-10 degrees, and may also accommodate electronic connector 500 that includes flank surfaces having a different taper angle selected from the range of 6-10 degrees. Here, electronic connector 900 is able to accommodate a taper angle range of at least 4 degrees for each flank surface or a total range across both flank surfaces of 8 degrees.

FIG. 11 depicts first magnetically attractable element 956 of electronic connector 900 aligned with and magnetically attracted to a corresponding magnetically attractable element 1196 of male electronic connector 1102. As an example, magnetically attractable element 1196 may refer to previously described magnetically attractable element 374 of electronic connector 100 or magnetically attractable element 774 of electronic connector 500. FIG. 11 further depicts second magnetically attractable element 958 of electronic connector 900 aligned with and magnetically attracted to a corresponding magnetically attractable element 1198 of male electronic connector 1102. As a non-limiting example, magnetically attractable element 1198 may refer to previously described magnetically attractable element 372 of electronic connector 100 or magnetically attractable element 772 of electronic connector 500.

FIG. 12 depicts another example electronic connector pair 1200 that provides a non-reversible connection between two electronic connectors by way of an inclined connection face. Electronic connector pair 1200 includes a male electronic connector 1210 and a female electronic connector 1220. Within FIG. 12, electronic connector pair 1200 is viewed along the X-coordinate axis, and male electronic connector 1210 interfaces with female electronic connector 1220 along the Z-coordinate axis.

Male electronic connector 1210 includes a base 1212 and a tapered extension 1214 protruding from base 1212. Base 1212 includes a connection surface 1216 that is inclined relative to a connection axis, the Z-coordinate axis, and the Y-coordinate axis depicted in FIG. 12. In other words, connection face is not parallel to either the XY plane or the XZ plane. Connection surface 1216 may take the form of a planar or substantially planar connection face in an example configuration. Connection surface 1216 is also asymmetric about plane 1218 that is parallel to the XZ coordinate plane and located along a centerline of tapered extension 1214.

Female electronic connector 1220 includes a connector body 1222 having an opening 1224 formed within a connection surface 1226. Connection surface 1226 may take the form of a planar or substantially planar connection face in an example configuration. Connection surface 1226 is also inclined relative to the connection axis, the Z-coordinate axis, and the Y-coordinate axis at the same angle as connection surface 1216 of male electronic connector 1210. Connection surface 1226 is also asymmetric about plane 1218 when female electronic connector 1220 is aligned with male electronic connector 1210.

While FIG. 12 depicts an example in which a connection surface is inclined relative to both the Z-coordinate axis and Y-coordinate axis, a connection surface may be inclined relative to alternative coordinate axes or additional coordinate axes while providing a non-reversible connection. In one example, a connection surface may be inclined relative to both the Z-coordinate axis and the X-coordinate axis, but not inclined relative to the Y-coordinate axis. In another example, a connection surface may inclined relative to both the Y-coordinate axis and the X-coordinate axis, but not inclined relative to the Z-coordinate axis. In yet another example, a connection surface may be inclined relative to the X-coordinate axis, the Y-coordinate axis, and the Z-coordinate axis.

The electronic connectors disclosed herein may take the form of multi-function electronic connectors that may be used for electronic devices. As a non-limiting example, an electronic device may take the form of a computing device, such as a tablet computer, desktop computer, notebook computer, handheld smartphone, digital camera, graphical display device, wearable device, server device, electronic appliance, or other suitable electronic device. The disclosed electronic connectors may replace or reduce the need for multiple independent connectors. In at least some configurations, the disclosed electronic connectors may serve as the only electronic connector located on or interfacing with an electronic device. In other configurations, two or more of the disclosed electronic connectors may be present on the same device. In such configurations, the device may be configured to pass power and/or data between different connected devices.

The disclosed electronic connector can fulfill a number of functions, across a broad range of data-intensive use-scenarios, including high-speed data transfer, native video input/output, and/or electrical power. Non-limiting examples of the signaling functions that may be supported by the disclosed electronic connectors include USB 2.0, USB 3.0, USB 3.1, DisplayPort (DP), mDP, HDMI, PCIE, and THUNDERBOLT™, among other suitable functions. The disclosed electronic connectors may enable the off-loading of graphics processing to graphics processing devices or data to data storage devices (e.g., to or from a hard drive). Data transfer rates of 20 Gbps, scalable to 40 Gbps and potentially higher, may be achieved by the disclosed electronic connectors, while power-only modes of operation (e.g., 6-A power capability) are supported across fewer connector pins (e.g., 4 connector pins).

FIGS. 13A, 13B, and 13C show a table 1300 depicting example pin-out configurations for an electronic connector. Table 1300 provides pin identifiers (P.1-P.40) along the vertical axis and a variety of different pin-out configurations (Config.A-Config.H) along the horizontal axis. Each pin identifier of table 1300 corresponds to a respective electrical contact of the electronic connector. Each value within table

1300 refers to a respective function for a corresponding pin identifier and pin-out configuration.

Example functions within table 1300 include one or more instances of power, ground, and/or communication signals. Communication signals may take the form of digital or analog signals. Where a particular value in Table 1300 includes the value "NC", that electrical contact may be optionally omitted from the electronic connector or may be included with the electronic connector, but may be otherwise deactivated or electrically decoupled from interaction with other electrical contacts or connectors.

Table 1300 further includes reference numerals along the vertical axis that associate pin identifiers with the previously described electrical contacts of electronic connector 100 of FIG. 1, electronic connector 500 of FIG. 5, and electronic connector 900 of FIG. 9. These reference numerals are provided in table 1300 as examples of pin-out configurations for these previously described electronic connectors. Other suitable pin-out configurations may be utilized. Furthermore, the pin-out configurations depicted in Table 1300 may be utilized in combination with electronic connectors having other forms or configurations.

Table 1300 and the preceding example electronic connectors provide a number of potential configurations in which an electronic connector may include a greater quantity of contacts (e.g., 40 contacts/pins) or a lesser quantity of contacts (e.g., 12 contacts/pins) in which a paired electronic connector may interface with either contact configuration. This multi-configuration approach across a range of electronic connectors allows for cost scaling in the form of reduced cost for certain implementations (e.g., power-only implementations) that utilize less than the full range of contacts or pins. Variable numbers of contacts or pins also allow for scalability of the connector form factor in terms of shape and size, and cable shape and size, providing designers with a broader range of available form factors, functionality, and cost.

Pin-out configuration Config.A includes power contacts at pin identifiers P.1, P.20, P.21, and P.40. In at least some implementations of this configuration, pin identifiers P.1 and P.40 may be bridged, and pin identifiers P.20 and P.21 may be bridged. These power contacts may convey power at one or more voltages. For example, power contacts may convey 5 volts to or from an accessory electronic device, and 12 volts to a display device at 1 ampere per contact.

Config.A further includes signal contacts HPD at pin identifiers P.2, P.19, P.22, and P.39. HPD refers to a hot plug detection signal that may be used by connected electronic devices to initiate or terminate power transmitted over other electrical contacts of the electronic connector. In one example, first signal contacts (HPD1) may be included at pin identifiers P.2 and P.39, and may be used for power control for one or more of pin identifiers P.1, P.20, P.21, and/or P.40. Second signal contacts (HPD2) may be included at pin identifiers P.19 and P.22, and may be additionally or alternatively used for power control for one or more of pin identifiers P.1, P.20, P.21, and/or P.40. In this example, pin identifiers P.2 and P.39 may be bridged with each other, and pin identifiers P.19 and P.22 may be bridged with each other. In at least some implementations, two or more signal contacts HPD1 may include different HPD signals, denoted as HPD1A and HPD1B, respectively. Similarly, signal contacts HPD2 may include different HPD signals, denoted as HPD2A and HPD2B, respectively. Hence, CONFIG.A may be used to convey two, three, or four different HPD signals, depending on implementation. In one example, signal contacts HPD2A and HPD2B may correspond to dock accessory authentication power.

Config.A further includes ground contacts at pin identifiers, P.3, P.6, P.9, P.12, P.15, P.18, P.23, P.26, P.29, P.32, P.35, and P.38. Ground contacts may serve as ground for both power and signal contacts. In at least some implementations of this configuration, the following pin identifier pairs may bridged with each other: P.3 and P.38, P.6 and P.35, P.9 and P.32, P.12 and P.29, P.15 and P.26, P.18 and P.23. Config.A depicts an example where ground contacts are distributed among power and signal contacts such that each power or signal contact is separated, at most, by one intermediate non-ground contact from a nearest ground contact. In at least some implementations, Config.A provides a reversible connection having two connection orientations due to the reversibility of power, ground, and HPD signal contacts.

Config.B includes a similar pin-out configuration to Config.A with the exception that ground contacts are not present at pin identifiers P.6, P.9, P.12, P.15, P.26, P.29, P.32, and P.35. Config.B may be used, for example, in combination with electronic connector 500 of FIG. 5 in which pin identifiers P.4-P.17 and P.24-P37 correspond to recessed regions of the connection faces. In at least some implementations, Config.B provides a reversible connection due to the reversibility of power, ground, and HPD signal contacts.

Config.C includes a similar pin-out configuration to Config.A with the exception that pin identifiers P.16, P.17, P.36, and P.37 collectively supporting USB 2.0 via signal contacts USB 2.0+ and USB 2.0−. Each USB 2.0 signal pair includes corresponding positive and negative signal contacts as indicated by the "+" and "−" identifiers. In at least some implementations of this pin-out configuration, P.17 and P.37 may be bridged with each other, and P.16 and P.36 may be bridged with each other. Furthermore, in at least some implementations, Config.C provides a reversible connection due to the reversibility of power, ground, and USB 2.0 signal contacts.

Config.D includes a similar pin-out configuration to Config.C with the exception that pin identifiers P.4, P.5, P.7, and P.8 collectively support USB 3.0 via signal contacts USB3 SS Rx+, USB3 SS Rx−, USB3 SS Tx+, and USB3 SS Tx−, and pin identifiers P.36 and P.37 do not support USB 2.0 in this example configuration. USB3 SS refers to USB 3.0 Super Speed lanes, in which Rx refers to receive lanes and Tx refers to transmit lanes. Each Rx receive lane pair includes corresponding positive and negative signal contacts. Similarly, each Tx transmit lane pair includes corresponding positive and negative signal contacts. In at least some implementations of this configuration, Config.D provides a single non-reversible connection orientation due to the non-reversible arrangement of USB 3.0 and USB 2.0 signal contacts.

Config.E includes the power, ground, and signal contacts of Config.A with the additional support for four pairs of signal contacts in the form of serial lanes: SERIAL LANE0A+, SERIAL LANE0A−, SERIAL LANE1A+, SERIAL LANE1A−, SERIAL LANE4A+, SERIAL LANE4A−, SERIAL LANE1B+, SERIAL LANE1B−, SERIAL LANE4B+, and SERIAL LANE4B−. Each serial lane pair includes corresponding positive and negative signal contacts. Serial lanes may be used within the context of a variety of communications protocols, including USB, HDMI, PCIE, or Thunderbolt™, for example. In at least some implementations, Config.E provides a reversible connection due to the reversibility of the power, ground, and SERIAL LANE signal contacts.

Config.F includes a similar pin-out configuration to Config.D with the exception that pin identifiers P.10, P.11, P.24, P.25, P.27, P.28, P.30, and P.31 support various instances of DisplayPort (DP) or mDP signal contacts in the form of DP LANE signal contact pairs. Additionally, pin identifiers P.36 and P.37 support an auxiliary (AUX) signal contact pair, pin identifier P.13 supports a DP HPD signal contact, P.14 supports an RFU signal contact, pin identifier P.33 supports a DP CONFIG1 signal contact, and pin identifier P.34 supports another RFU signal contact. Each DP lane pair includes corresponding positive and negative signal contacts. Similarly, each AUX signal pair includes corresponding positive and negative signal contacts.

Within Config.F, signal contacts 10 and 11 include DP LANE 3+ and DP LANE 3− at P.10 and P.11. One or more of the DP lanes may instead take the form of serial lanes. As a non-limiting example, DP LANE 0+/− may instead take the form of SERIAL LANE 1 Rx+/−, DP LANE 1+/− may instead take the form of SERIAL LANE 1 Tx+/−, DP LANE 2+/− may instead take the form of SERIAL LANE 0 Rx+/−, and DP LANE 3 may instead take the form of SERIAL LANE 0 Tx+/−. Conversely, one or more of the previously described serial lanes may instead take the form of DP lanes.

Signal contacts DP HPD, RFU, and DP CONFIG1 may be used to convey debugging signals when used in conjunction with a display device or electronic device accessory. As a non-limiting example, DP HPD may be used for Display Port hot plug detection, and CONFIG1 may be used for Display Port configuration detection and/or HDMI/Display Port selection for Display Port dual mode support. However, one or more of these signal contacts may be omitted or may not be used for signaling in other implementations. For example, one or more of DP HPD, RFU, and/or DP CONFIG1 signal contacts may be used differently during a development or testing phase of operation than during other operational phases (e.g., primary/public release operational phases), or may be used differently depending on the electronic device(s) that are communicating via the connector. In at least some implementations, Config.F provides a non-reversible connection orientation due to the non-reversible arrangement of the DP LANE, AUX, DP HPD, DP CONFIG1, USB 2.0 and USB 3.0 signal contacts.

Config.G includes a similar pin-out configuration to Config.E, with the exception that pin identifiers P.10, P.11, P.13, P.14, P.30, P.31, P.33, P.34 include additional instances of SERIAL LANE signal contacts. In at least some implementations, Config.G provides a reversible connection due to the reversibility of the power, ground, and SERIAL LANE signal contacts. Config.G also provides an additional example of HPD signal contacts having a different orientation as compared to the previously described configurations.

Config.H includes a similar pin-out configuration to Config.F except for HPD signal contacts have a different orientation, such as previously depicted in Config.G. In at least some implementations, Config.H provides a non-reversible connection orientation due to the non-reversible arrangement of the DP LANE, AUX, DP HPD, DP CONFIG1, USB 2.0 and USB 3.0 signal contacts.

In one implementation, the preceding pin configurations denoted as non-reversible may be used in combination with electronic connectors that support only a single connection orientation to ensure that pin configurations are properly maintained across paired electronic connectors. However, reversibility of paired electronic connectors may also improve user experience for establishing an electrical connection. Accordingly, in another implementation, pin configurations denoted as non-reversible may be used in combination with electronic connectors that support multiple connection orientations through the use of reconfigurable multiplexers and multiplexer control circuits that are part of the electronic device.

Each multiplexer may be responsive to a multiplexer selection signal that is determined by and originates from a multiplexer control circuit. The multiplexer control circuit detects the orientation of a male electronic connector relative to a female electronic connector.

If, for example, the analog input/output connectors and digital input/output connectors of the male electronic connector are in a first orientation relative to the female electronic connector, then the multiplexer control circuit provides multiplexer selection signals to the multiplexers to select the appropriate analog or digital multiplexer settings to support that orientation. If the analog input/output connectors and digital input/output connectors of the male electronic connector are in a second, reversed orientation relative to the female electronic connector, then the multiplexer control circuit provides opposite multiplexer selection signals to the multiplexers to select the appropriate analog or digital multiplexer settings to support that reversed orientation. In one alternative, a DC voltage on a contact of the connector may serve as the multiplexer control signal. For example, a particular contact female-side may receive zero volts when the male-side connector is inserted in a first orientation, and five volts when the male-side connector is inserted in a second orientation. The voltage on the particular contact may be received by one or more multiplexers as the select signal to switch the male-side contacts to the appropriate female-side signals.

As a non-limiting example, within the context of Config.H, a RFU signal contact may instead correspond with an additional RFU signal contact in a reversed connection orientation, and CONFIG1 may instead correspond with DP HPD in the reversed connection orientation.

Reversible and non-reversible connectors may optionally include one or more connection detection circuits associated with two or more respective HPD signal contacts. For example, referring to Table 1300, pin/contact identifiers 19 and 39 supporting HPD signaling are located near opposite ends or poles of the electronic connector as measured, for example, along the longest dimension of the electronic connector. Connection detection circuits may cooperatively form an AND gate that withholds power from other electrical contacts of the electronic connector (e.g., pin/contact identifiers 1, 20, 21, and 40) unless both pin/contact identifiers 19 and 39 have been connected to corresponding power pin/contacts of a paired electronic connector. This feature may be used to ensure that a complete connection has been established between paired electronic connectors before power and/or data is applied across the interface.

Reversible and non-reversible connectors may optionally include one or more power control circuits. For example, HPD signal paths may be used to communicate power control information between two electronic devices across paired electronic connectors. For example, these two electronic devices may utilize a specified message format to communicate power control information back and forth across the paired electronic connectors. Each electronic device may use the power control information to specify when and how much power to transfer back and forth across the paired electronic connectors.

While this type of smart power control may be available in some use-scenarios, in other use-scenarios an electronic connector may interface with a dumb power source that does not support this type of control (e.g., an electrical power outlet adapter, also known as a wall charger). Such an electrical power outlet adapter may not support the ability to send or receive power control messages, power negation messages, and/or authentication messages, such as via HPD or another suitable signal path of the paired electronic connectors. In such cases, an electronic device that is electrically connected to the electrical power outlet adapter via the paired electronic connectors may be configured to determine how much electrical power that electronic device can safely draw from the electrical power outlet adapter and self-throttle power reception to the self-determined power level. For example, a resistor may be included in the path of one of the electrical contacts of the electrical power outlet adapter. The size of the resistor may be chosen based on the intended power delivery of the electrical power outlet adapter. When mated with the electronic connector of the electronic device, the electronic device may be able to determine the resistor value by placing a defined voltage across the resistor and/or by drawing a defined current through the resistor. The determined resistor value may signal to the electronic device how much power the electronic device should draw from the electrical power outlet adapter. For example, a 1 kohm resistor may indicate that 100 mA can be supplied, a 10 kohm resister may indicate that 500 mA can be supplied, and a 100 kohm resistor may indicate that 1000 mA can be supplied. This scheme may operate in the reverse direction (i.e., the device may supply power to a peripheral).

The disclosed electrical contacts have been described by example in terms of transferring electrical power, ground, and/or signals across a connector interface through physical surface contact with another electrical contact. However, in other configurations, one or more of the electrical connectors may transfer electrical power, ground, and/or signals across a connector interface without physical surface contact via induction. In such case, the interface may, for example, include an air gap and/or electrically insulating, non-conductive materials located between paired electrical contacts or other suitable inductor components that are used to exchange power, ground, and/or signals via induction. Transformers and coils, for example, may be used to facilitate transfer by induction.

The disclosed connectors have been described by example as electronic connectors having one or more electrical contacts. However, in other configurations, the disclosed connectors may instead take the form of optical connectors having one or more optical contacts or optical interfaces. For example, one or more electrical contacts of an electronic connector may instead refer to optical contacts or optical interfaces of an optical connector that are configured to exchange optical signals with corresponding optical contacts or optical interfaces of a paired optical connector. Further, connectors that utilize both electrical and optical interfaces are within the scope of this disclosure.

The configurations and/or approaches described herein are exemplary in nature, and these specific embodiments or examples are not to be considered in a limiting sense, because numerous variations are possible. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An electronic connector, comprising:
   a base;
   a tapered extension protruding from the base, the tapered extension including:
      a nose forming a terminal end of the tapered extension,
      a first connection face,
      a second connection face, the first connection face and the second connection face tapering toward each other from the base to the nose symmetrically about a first symmetry plane,
      a first flank surface, and
      a second flank surface, the first flank surface and the second flank surface forming respective opposing sides of the tapered extension between the first connection face and the second connection face, and tapering toward each other from the base to the nose symmetrically about a second symmetry plane that is orthogonal to the first symmetry plane;
   a first power electrical contact and a first ground electrical contact located along the first connection face proximate to the first flank surface;
   a second power electrical contact and a second ground electrical contact located along the first connection face proximate to the second flank surface;
   a third power electrical contact and a third ground electrical contact located along the second connection face proximate to the first flank surface; and
   a fourth power electrical contact and a fourth ground electrical contact located along the second connection face proximate to the second flank surface.

2. The electronic connector of claim 1, wherein the first connection face includes a first recessed portion between the first ground electrical contact and the second ground electrical contact, and wherein the second connection face includes a second recessed portion between the third ground electrical contact and the fourth ground electrical contact.

3. The electronic connector of claim 1, wherein the first connection face extends uninterrupted in a continuous plane between the first ground electrical contact and the second ground electrical contact, and wherein the second connection face extends uninterrupted in a continuous plane between the third ground electrical contact and the fourth ground electrical contact.

4. The electronic connector of claim 1, further comprising a first subset of electrical contacts located along the first connection face between the first ground electrical contact and the second ground electrical contact, and a second subset of electrical contacts located along the second connection face between the third ground electrical contact and the fourth ground electrical contact.

5. The electronic connector of claim 1, further comprising an electrical ground conductor body contained at least partially within the tapered extension, and electrically connected to the first ground electrical contact, the second ground electrical contact, the third ground electrical contact, and the fourth ground electrical contact.

6. The electronic connector of claim 5, wherein the electrical ground conductor body includes a flat conductive plate portion that is parallel to and near the first symmetry plane.

7. The electronic connector of claim 5, further comprising a first subset of one or more ground electrical contacts electrically connected to the electrical ground conductor body and located along the first connection face between the first ground electrical contact and the second ground electrical contact; and a second subset of one or more ground electrical contacts electrically connected to the electrical ground conductor body and located along the second connection face between the third ground electrical contact and the fourth ground electrical contact.

8. A docking station, comprising:
   a docking base;
   a tapered extension protruding from the docking base, the tapered extension including:

a nose forming a terminal end of the tapered extension,
a first connection face,
a second connection face, the first connection face and the second connection face tapering toward each other from the base to the nose symmetrically about a first symmetry plane,
a first flank surface, and
a second flank surface, the first flank surface and the second flank surface forming respective opposing sides of the tapered extension between the first connection face and the second connection face, and tapering toward each other from the base to the nose symmetrically about a second symmetry plane that is orthogonal to the first symmetry plane;
a first power electrical contact and a first ground electrical contact located along the first connection face proximate to the first flank surface;
a second power electrical contact and a second ground electrical contact located along the first connection face proximate to the second flank surface;
a third power electrical contact and a third ground electrical contact located along the second connection face proximate to the first flank surface; and
a fourth power electrical contact and a fourth ground electrical contact located along the second connection face proximate to the second flank surface.

9. The docking station of claim 8, wherein the first connection face includes a first recessed portion between the first ground electrical contact and the second ground electrical contact, and wherein the second connection face includes a second recessed portion between the third ground electrical contact and the fourth ground electrical contact.

10. The docking station of claim 8, wherein the first connection face extends uninterrupted in a continuous plane between the first ground electrical contact and the second ground electrical contact, and wherein the second connection face extends uninterrupted in a continuous plane between the third ground electrical contact and the fourth ground electrical contact.

11. The docking station of claim 8, further comprising a first subset of electrical contacts located along the first connection face between the first ground electrical contact and the second ground electrical contact, and a second subset of electrical contacts located along the second connection face between the third ground electrical contact and the fourth ground electrical contact.

12. The docking station of claim 8, further comprising an electrical ground conductor body contained at least partially within the tapered extension, and electrically connected to the first ground electrical contact, the second ground electrical contact, the third ground electrical contact, and the fourth ground electrical contact.

13. The docking station of claim 12, wherein the electrical ground conductor body includes a flat conductive plate portion that is parallel to and near the first symmetry plane.

14. The docking station of claim 12, further comprising a first subset of one or more ground electrical contacts electrically connected to the electrical ground conductor body and located along the first connection face between the first ground electrical contact and the second ground electrical contact; and a second subset of one or more ground electrical contacts electrically connected to the electrical ground conductor body and located along the second connection face between the third ground electrical contact and the fourth ground electrical contact.

15. An electronic accessory device, comprising:
a base;
a tapered extension protruding from the base, the tapered extension including:
a nose forming a terminal end of the tapered extension,
a first connection face,
a second connection face, the first connection face and the second connection face tapering toward each other from the base to the nose symmetrically about a first symmetry plane,
a first flank surface, and
a second flank surface, the first flank surface and the second flank surface forming respective opposing sides of the tapered extension between the first connection face and the second connection face, and tapering toward each other from the base to the nose symmetrically about a second symmetry plane that is orthogonal to the first symmetry plane;
a first power electrical contact and a first ground electrical contact located along the first connection face proximate to the first flank surface;
a second power electrical contact and a second ground electrical contact located along the first connection face proximate to the second flank surface;
a third power electrical contact and a third ground electrical contact located along the second connection face proximate to the first flank surface; and
a fourth power electrical contact and a fourth ground electrical contact located along the second connection face proximate to the second flank surface.

16. The electronic accessory device of claim 15, wherein the first connection face includes a first recessed portion between the first ground electrical contact and the second ground electrical contact, and wherein the second connection face includes a second recessed portion between the third ground electrical contact and the fourth ground electrical contact.

17. The electronic accessory device of claim 15, wherein the first connection face extends uninterrupted in a continuous plane between the first ground electrical contact and the second ground electrical contact, and wherein the second connection face extends uninterrupted in a continuous plane between the third ground electrical contact and the fourth ground electrical contact.

18. The electronic accessory device of claim 15, further comprising a first subset of electrical contacts located along the first connection face between the first ground electrical contact and the second ground electrical contact, and a second subset of electrical contacts located along the second connection face between the third ground electrical contact and the fourth ground electrical contact.

19. The electronic accessory device of claim 15, further comprising an electrical ground conductor body contained at least partially within the tapered extension, and electrically connected to the first ground electrical contact, the second ground electrical contact, the third ground electrical contact, and the fourth ground electrical contact.

20. The electronic accessory device of claim 19, wherein the electrical ground conductor body includes a flat conductive plate portion that is parallel to and near the first symmetry plane.

* * * * *